United States Patent
Oda et al.

(10) Patent No.: US 10,615,868 B2
(45) Date of Patent: Apr. 7, 2020

(54) COMMUNICATION SYSTEM AND FAULT DETECTION METHOD

(71) Applicant: NIPPON TELEGRAPH AND TELEPHONE CORPORATION, Tokyo (JP)

(72) Inventors: Takuya Oda, Yokosuka (JP); Tetsuro Inui, Yokosuka (JP); Akira Hirano, Yokosuka (JP); Wataru Imajuku, Yokosuka (JP); Shoukei Kobayashi, Yokosuka (JP); Takafumi Tanaka, Yokosuka (JP); Yutaka Miyamoto, Yokosuka (JP); Hidehiko Takara, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/778,910

(22) PCT Filed: Nov. 22, 2016

(86) PCT No.: PCT/JP2016/084600
§ 371 (c)(1),
(2) Date: May 24, 2018

(87) PCT Pub. No.: WO2017/090611
PCT Pub. Date: Jun. 1, 2017

(65) Prior Publication Data
US 2018/0359024 A1 Dec. 13, 2018

(30) Foreign Application Priority Data
Nov. 26, 2015 (JP) .................................. 2015-230872

(51) Int. Cl.
*H04J 14/00* (2006.01)
*H04B 10/077* (2013.01)
(Continued)

(52) U.S. Cl.
CPC ..... *H04B 10/0771* (2013.01); *G02B 6/02042* (2013.01); *H04B 10/077* (2013.01);
(Continued)

(58) Field of Classification Search
CPC ............ H04B 10/0771; H04B 10/2581; H04B 10/077; H04B 10/25753; H04J 14/02;
(Continued)

(56) References Cited

U.S. PATENT DOCUMENTS 5,663,820 A * 9/1997 Shiragaki ............ H04J 14/0212
370/360
6,005,696 A * 12/1999 Joline .................... H04B 10/07
370/241
(Continued)

FOREIGN PATENT DOCUMENTS

JP 2011160086 A 8/2011
JP 2014022852 A 2/2014
(Continued)

OTHER PUBLICATIONS

Tanaka et al, Experimental Evaluation of Recovery From Multiple Failures in Multicore Fiber Links, Jan. 2015, JLT, All Document. (Year: 2015).*
(Continued)

*Primary Examiner* — Dibson J Sanchez
(74) *Attorney, Agent, or Firm* — Harness, Dickey & Pierce, P.L.C.

(57) ABSTRACT

A communication system which includes: three or more nodes; a multi-core fiber having a plurality of cores, the multi-core fiber being used in at least a partial segment of a
(Continued)

connection between the nodes; a detection signal output unit configured to output a fault detection signal transmitted by the core provided in the multi-core fiber configured to connect together the nodes; and a fault detection unit configured to determine whether a fault has occurred between the nodes on the basis of a detection result of the fault detection signal.

9 Claims, 15 Drawing Sheets

(51) Int. Cl.
    *H04L 12/437* (2006.01)
    *H04B 10/2575* (2013.01)
    *G02B 6/02* (2006.01)
    *H04J 14/02* (2006.01)
    *H04B 10/2581* (2013.01)

(52) U.S. Cl.
    CPC ... *H04B 10/2581* (2013.01); *H04B 10/25753* (2013.01); *H04J 14/00* (2013.01); *H04J 14/02* (2013.01); *H04J 14/0201* (2013.01); *H04L 12/437* (2013.01)

(58) Field of Classification Search
    CPC ..... H04J 14/00; H04J 14/0201; H04L 12/437; G02B 6/02042
    USPC .......................... 398/9–38, 43–103, 140–172
    See application file for complete search history.

(56) References Cited

U.S. PATENT DOCUMENTS

| | | | | |
|---|---|---|---|---|
| 6,038,044 | A * | 3/2000 | Fee | H04B 10/27 398/1 |
| 6,233,072 | B1 * | 5/2001 | Liu | H04Q 11/0062 370/242 |
| 6,317,231 | B1 * | 11/2001 | Al-Salameh | H04B 10/077 398/14 |
| 6,317,429 | B1 | 11/2001 | Nakata et al. | |
| 6,980,736 | B1 * | 12/2005 | Fee | H04Q 11/0005 398/12 |
| 7,242,862 | B2 * | 7/2007 | Saunders | H04B 10/0793 398/16 |
| 7,447,430 | B2 * | 11/2008 | Nogi | H04J 14/0227 398/15 |
| 7,603,033 | B1 * | 10/2009 | Lumetta | H04B 10/03 398/5 |
| 7,711,267 | B2 * | 5/2010 | Wellbrock | H04L 43/0847 398/17 |
| 7,730,376 | B2 * | 6/2010 | Das Sharma | G06F 11/0751 714/712 |
| 7,822,110 | B1 * | 10/2010 | Doblar | H04B 3/466 375/224 |
| 8,180,216 | B2 * | 5/2012 | Xia | H04J 3/0682 398/16 |
| 9,154,220 | B2 * | 10/2015 | Sugawara | G02B 6/02042 398/5 |
| 9,887,774 | B2 * | 2/2018 | Huang | H04B 10/07955 |
| 9,900,089 | B2 * | 2/2018 | Yuki | H04B 10/07955 |
| 2002/0044322 | A1 * | 4/2002 | Blumenthal | H04B 10/00 398/147 |
| 2002/0097460 | A1 * | 7/2002 | Ikoma | H04B 10/00 398/9 |
| 2002/0149812 | A1 * | 10/2002 | Hong | H04B 10/00 398/27 |
| 2004/0096216 | A1 * | 5/2004 | Ito | H04B 10/0775 398/33 |
| 2004/0175171 | A1 * | 9/2004 | Kokkinos | H04B 10/00 398/14 |
| 2004/0223759 | A1 * | 11/2004 | Fee | H04B 10/079 398/33 |
| 2005/0013532 | A1 * | 1/2005 | Heiles | H04J 14/0291 385/16 |
| 2008/0232760 | A1 * | 9/2008 | Xia | H04B 10/0775 385/140 |
| 2010/0162033 | A1 * | 6/2010 | Ahn | G06F 11/2007 714/4.1 |
| 2010/0253936 | A1 * | 10/2010 | Xia | G01M 11/333 356/73.1 |
| 2010/0266275 | A1 * | 10/2010 | Xia | H04B 10/0773 398/16 |
| 2010/0272431 | A1 * | 10/2010 | Chen | H04B 10/07951 398/16 |
| 2010/0329671 | A1 * | 12/2010 | Essiambre | G02B 6/14 398/44 |
| 2011/0142439 | A1 * | 6/2011 | Chen | H04B 10/0775 398/16 |
| 2011/0142440 | A1 * | 6/2011 | Xia | H04B 10/0775 398/16 |
| 2011/0176804 | A1 * | 7/2011 | Blinkert | G02B 6/356 398/45 |
| 2011/0274435 | A1 * | 11/2011 | Fini | G02B 6/02042 398/139 |
| 2012/0066531 | A1 * | 3/2012 | Shafai | H04W 52/0206 713/323 |
| 2012/0224170 | A1 * | 9/2012 | Hisamoto | H04B 10/077 356/73.1 |
| 2012/0321296 | A1 * | 12/2012 | Wellbrock | H04B 10/038 398/5 |
| 2013/0148963 | A1 * | 6/2013 | Cvijetic | H04J 14/04 398/45 |
| 2013/0194566 | A1 * | 8/2013 | Schell | G01M 11/3136 356/73.1 |
| 2013/0195462 | A1 * | 8/2013 | Ghioni | H04J 14/0212 398/83 |
| 2013/0209106 | A1 * | 8/2013 | Mukasa | H04J 14/02 398/79 |
| 2013/0236175 | A1 * | 9/2013 | Sethumadhavan | H04J 14/04 398/55 |
| 2013/0315579 | A1 * | 11/2013 | Xia | H04Q 11/0001 398/5 |
| 2014/0112658 | A1 * | 4/2014 | Hurley | H04J 14/021 398/28 |
| 2014/0140694 | A1 * | 5/2014 | Zhou | H04J 14/02 398/44 |
| 2014/0241712 | A1 | 8/2014 | Sugawara et al. | |
| 2014/0270776 | A1 * | 9/2014 | Jinno | H04J 14/0204 398/69 |
| 2014/0355981 | A1 * | 12/2014 | Miyazaki | H04J 14/021 398/38 |
| 2015/0078744 | A1 | 3/2015 | Ito et al. | |
| 2015/0208146 | A1 * | 7/2015 | Younce | H04Q 11/0066 398/21 |
| 2015/0222356 | A1 * | 8/2015 | Kawanishi | H04J 14/04 398/43 |
| 2015/0229438 | A1 * | 8/2015 | Le Taillandier De Gabory | H04B 10/2581 398/182 |
| 2015/0237421 | A1 * | 8/2015 | Morgan | H04Q 11/0005 398/45 |
| 2015/0278040 | A1 * | 10/2015 | Sikkink | G06F 13/4022 714/5.1 |
| 2016/0056889 | A1 * | 2/2016 | Le Taillandier De Gabory | H04L 25/14 398/16 |
| 2016/0099851 | A1 * | 4/2016 | Archambault | H04J 14/0212 398/16 |
| 2016/0315701 | A1 * | 10/2016 | Yuki | H04J 14/0221 |

(56) References Cited

U.S. PATENT DOCUMENTS

2016/0344470 A1* 11/2016 Reddy Bovilla ...... H04B 10/03
2017/0160466 A1* 6/2017 Imamura ........... C03B 37/01205

FOREIGN PATENT DOCUMENTS

| JP | 2014-165595 A | 9/2014 |
|---|---|---|
| JP | 2016111480 A | 6/2016 |
| WO | WO-2014/141533 A1 | 9/2014 |

OTHER PUBLICATIONS

International Search Report issued in PCT/JP2016/084600, dated Jan. 10, 2017; ISA/JP, Tokyo, with English translation.
Shinji Matsuoka, Ultrahigh-speed Ultrahigh-capacity Transport Network Technology for Cost-effective Core and Metro Networks, NTT Technical Journal, Mar. 2011, pp. 8-12 with English version.
Yutaka Miyamoto and Hirokazu Takenouchi, Dense Space-division-multiplexing Optical Communications Technology for Petabit-per-second Class Transmission, NTT Technical Journal, Aug. 2014, pp. 52-56 with English version.
Kazuyuki Shiraki, R&D Trends in Optical Fiber and Cable Technology, NTT Technical Journal, Jan. 2015, pp. 59-63 with English version published Mar. 2015.
R. R. Thomson, et al, "Ultrafast-laser inscription of a three dimensional fan-out device for multicore fiber coupling applications", Optics Express, OSA Publishing, Sep. 3, 2007, vol. 15, No. 18, pp. 11691-11697.
W. Klaus, et al, "Free-Space Coupling Optics for Multicore Fibers", Photonics Technology Letters, IEEE, Nov. 1, 2012, vol. 24, No. 21, pp. 1902-1905.
Japanese Notice of Allowance regarding JPSN 2017552663, dated Feb. 5, 2019.
Extended European Search Report regarding 168685543, dated Jun. 14, 2019.

* cited by examiner

FIG. 14

| FAULT LOCATION | TRANSMISSION DIRECTION FROM TRANSCEIVING NODE 510a TO TRANSCEIVING NODE 510b | | | TRANSMISSION DIRECTION FROM TRANSCEIVING NODE 510b TO TRANSCEIVING NODE 510a | | |
|---|---|---|---|---|---|---|
| | ADD/DROP NODE 520-1 | ADD/DROP NODE 520-2 | ADD/DROP NODE 520-3 | ADD/DROP NODE 520-1 | ADD/DROP NODE 520-2 | ADD/DROP NODE 520-3 |
| MCF600-1 | × | × | × | ○ | ○ | ○ |
| MCF600-2 | ○ | × | × | × | ○ | ○ |
| MCF60-3 | ○ | ○ | × | × | × | ○ |
| MCF600-4 | ○ | ○ | ○ | × | × | × |

COMMUNICATION SYSTEM AND FAULT DETECTION METHOD

TECHNICAL FIELD

The present invention relates to a communication system and a fault detection method.

This application is a 371 U.S. National Phase of PCT/JP2016/084600, filed on Nov. 22, 2016 and published in Japanese as WO 2017/090611 on Jun. 1, 2017. Priority is claimed on Japanese Patent Application No. 2015-230872, filed Nov. 26, 2015; the content of both applications is incorporated herein by reference.

BACKGROUND ART

A communication network that uses optical fibers is constructed in a core network that connects together metropolises and a metro network that connects together bases in an area. In such a network, a plurality of optical fibers are used in a bundle. Wavelength division multiplexing (WDM) transmission which involves multiplexing a plurality of optical signals having different wavelengths is performed on respective individual optical fibers to realize high-capacity signal transmission (for example, see Non-Patent Literature 1). In order to further increase the transmission capacity, the use of a multi-core fiber (MCF) which is an optical fiber having a plurality of cores instead of an optical fiber (single core fiber: SCF) having one core has been discussed (for example, see Non-Patent Literatures 2 and 3).

In a network configured using an MCF, since a transmission volume in one MCF is large, a fault in an MCF may have an influence on communication between a plurality of nodes. Due to this, when a fault occurs in an MCF, it is necessary to quickly detect the fault and specify a faulty MCF.

CITATION LIST

Non-Patent Literature

[Non-Patent Literature 1]
Shinji Matsuoka, "Ultrahigh-speed Ultrahigh-capacity Transport Network Technology for Cost-effective Core and Metro Networks," NTT Technical Journal, March 2011, pages 8-12
[Non-Patent Document 2]
Yutaka Miyamoto and Hirokazu Takenouchi, "Dense Space-division-multiplexing Optical Communications Technology for Petabit-per-second Class Transmission," NTT Technical Journal, August 2014, pages 52-56
[Non-Patent Document 3]
Kazuyuki Shiraki, "R&D Trends in Optical Fiber and Cable Technology," NTT Technical Journal, January 2015, pages 59-63

SUMMARY OF INVENTION

Technical Problem

In view of the above-described problems, an object of the present invention is to provide a communication system and a fault detection method capable of detecting faults and specifying fault locations in a network configured using a multi-core fiber.

Solution to Problem

A communication system according to a first aspect of the present invention is a communication system includes: three or more nodes; a multi-core fiber having a plurality of cores, the multi-core fiber being used in at least a partial segment of a connection between the nodes; a detection signal output unit configured to output a fault detection signal transmitted by the core provided in the multi-core fiber configured to connect together the nodes; and a fault detection unit configured to determine whether a fault has occurred between the nodes on the basis of a detection result of the fault detection signal.

According to a second aspect of the present invention, in the communication system according to the first aspect, the detection signal output unit is configured to output the fault detection signal to the core that is not used for communication between the nodes.

According to a third aspect of the present invention, in the communication system according to the first aspect, the detection signal output unit is configured to output the fault detection signal to the core which is used for communication between the nodes.

According to a fourth aspect of the present invention, in the communication system according to any one of the second or third aspect, the detection signal output unit is configured to output the fault detection signal that includes information on monitoring or operation in the communication system.

According to a fifth aspect of the present invention, in the communication system according to any one of the first to fourth aspects, the fault detection unit is provided in the respective nodes.

According to a sixth aspect of the present invention, in the communication system according to any one of the first to fifth aspects, the fault detection unit is configured to determine that a fault has occurred when reception light including the fault detection signal is not detected.

According to a seventh aspect of the present invention, in the communication system according to any one of the first to sixth aspects, the communication system further includes a fault location specifying unit that is configured to specify a section between nodes which a fault has occurred on the basis of a determination result obtained by the fault detection unit.

According to an eighth aspect of the present invention, in the communication system according to any one of the first to seventh aspects, when it is determined that a fault has occurred between the nodes, the fault detection unit is configured to notify a higher-layer controller of fault information indicating the occurrence of the fault and a segment in which the fault is detected.

A fault detection method according to a ninth aspect of the present invention is a fault detection method in a communication system including three or more nodes, and a multi-core fiber having a plurality of cores, the multi-core fiber being used in at least a partial segment of a connection between the nodes, the fault detection method including: a detection signal output step of outputting a fault detection signal transmitted by the core provided in the multi-core fiber configured to connect together the nodes; and a fault detection step of determining whether a fault has occurred between the nodes on the basis of a detection result of the fault detection signal.

Advantageous Effects of Invention

According to the present invention, it is possible to detect faults and specify fault locations in a network configured using a multi-core fiber.

BRIEF DESCRIPTION OF DRAWINGS

FIG. 14 is a diagram showing an example of a table used when a fault location is specified in the first embodiment.

DESCRIPTION OF EMBODIMENTS

Figure 1:
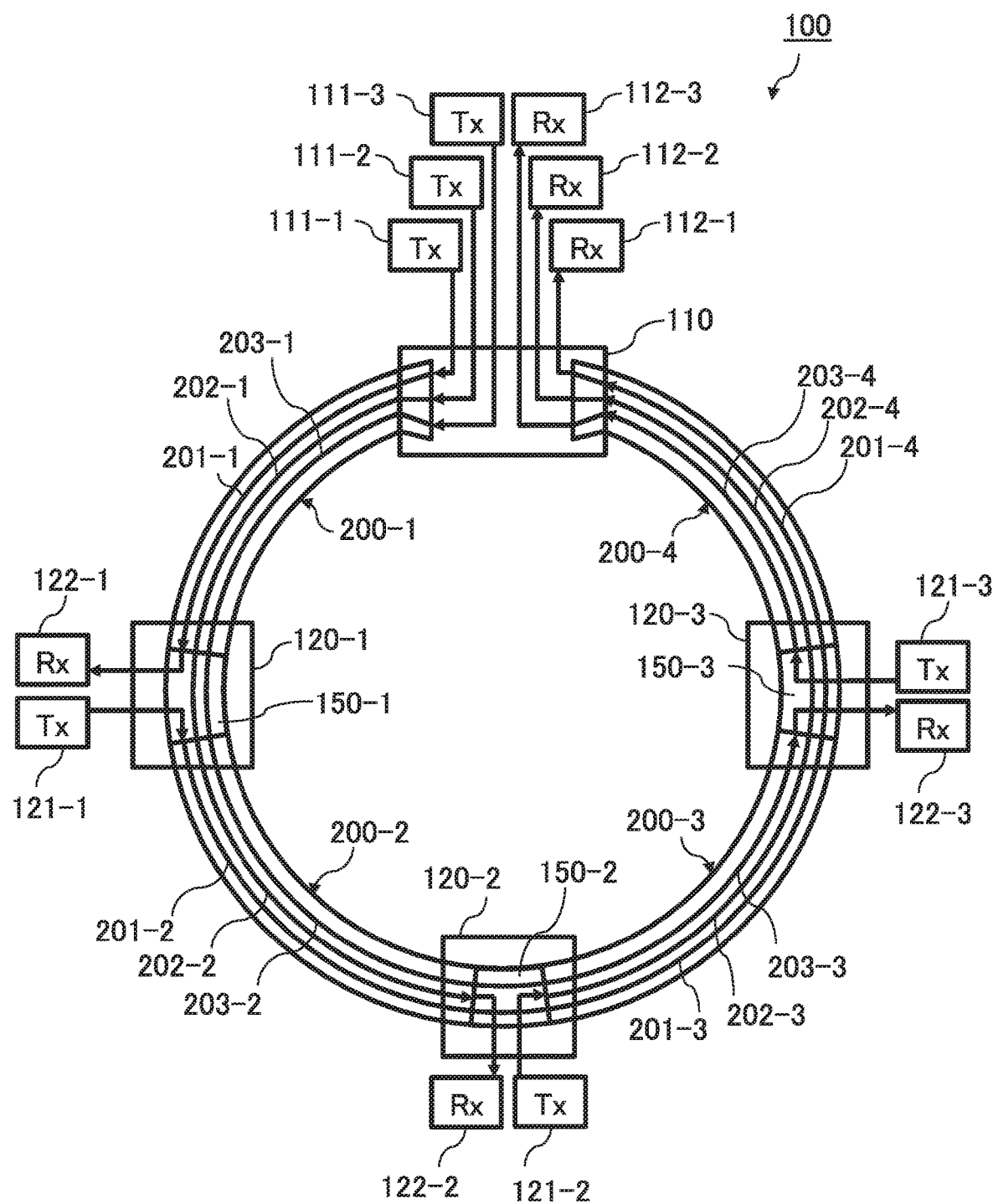
FIG. 1 is a diagram showing a first configuration example of a communication system according to the present invention.

Hereinafter, a communication system and a fault detection method according to an embodiment of the present invention will be described with reference to the drawings. In the following embodiments, elements denoted by the same reference numerals perform similar operations and redundant description thereof will be omitted appropriately.

First, an example of a communication system to which an embodiment of the present invention can be applied and which uses a multi-core fiber (MCF) will be described. FIG. 1 is a diagram showing a configuration example of a communication system 100 which uses an MCF according to the present invention. The communication system 100 includes a transceiving node 110 and n Add/Drop nodes 120, n being an integer of 1 or more. FIG. 1 shows a configuration example of the communication system 100 when n=3. In the following description, the respective n Add/Drop nodes 120 will be referred to as Add/Drop nodes 120-1 to 120-$n$. Moreover, the transceiving node 110 and the Add/Drop node 120 will be collectively referred to as a "node." In the following description, a transmitting device, a receiving device, a transceiving device, and the like that perform communication using optical signals and nodes will be described as individual configurations. However, a node may include a transmitting device, a receiving device, a transceiving device, and the like.

Nodes are connected together by multi-core fibers (MCFs) 200-1 to 200-4. The communication system 100 has a physical topology of a single-system one-way ring configuration in which the nodes are connected together by the MCFs 200-1 to 200-4. The transceiving node 110 and the Add/Drop node 120-1 are connected together by the MCF 200-1. The Add/Drop node 120-1 and the Add/Drop node 120-2 are connected together by the MCF 200-2. The Add/Drop node 120-2 and the Add/Drop node 120-3 are connected together by the MCF 200-3. The Add/Drop node 120-3 and the transceiving node 110 are connected together by the MCF 200-4. Each of the MCFs 200-1 to 200-4 of the communication system 100 has three cores 201, 202, and 203.

To generalize the description of the configuration of the communication system 100, an Add/Drop node 120-$i$ (1≤i≤n−1) is connected to an Add/Drop node 120-($i$+1) by an MCF 200-($i$+1). The MCF 200-1 connects together the transceiving node 110 and the Add/Drop node 120-1. The MCF 200-($n$+1) connects together the Add/Drop node 120-$n$ and the transceiving node 110.

Each node of the communication system 100 includes a transmitting device (Tx) and a receiving device (Rx) that perform communication between the nodes. Transmitting devices 111-1 to 111-3 and receiving devices 112-1 to 112-3 are provided in the transceiving node 110. A transmitting device 121-1 and a receiving device 122-1 are provided in the Add/Drop node 120-1. A transmitting device 121-2 and a receiving device 122-2 are provided in the Add/Drop node 120-2. A transmitting device 121-3 and a receiving device 122-3 are provided in the Add/Drop node 120-3. The transmitting devices 111-1 to 111-3 generate optical signals to be transmitted to the Add/Drop nodes 120-1 to 120-3, respectively. The receiving devices 112-1 to 112-3 receive optical signals transmitted from the Add/Drop nodes 120-1 to 120-3 and acquire information included in the optical signals. The transmitting devices 121-1 to 121-3 generate optical signals to be transmitted to the transceiving node 110. The receiving devices 122-1 to 122-3 receive optical signals transmitted from the transceiving node 110 and acquire information included in the optical signals.

The transmitting devices 111-1 to 111-3 generate optical signals addressed to the Add/Drop nodes 120-1 to 120-3, respectively. The three optical signals generated by the transmitting devices 111-1 to 111-3 are added to the cores 201-1 to 203-1 of the MCF 200-1, respectively. The receiving devices 112-1 to 112-3 receive optical signals transmitted from the Add/Drop nodes 120-1, 120-2, and 120-3 to nodes included in the receiving devices, respectively. The receiving devices 112-1 to 112-3 receive optical signals from the Add/Drop nodes 120-1 to 120-3 via the cores 201-4 to 203-4 of the MCF 200-4. A fan-in device or a fan-out device is used for adding optical signals to the MCF 200 and dropping optical signals from the MCF 200 in the transceiving node 110.

The fan-in device is a device which is connected to each of the cores in a multi-core fiber and which adds optical signals to the cores. The fan-out device is a device which is connected to each of the cores in a multi-core fiber and which drops each of optical signals propagating through the cores. Since the only difference between the devices is that the propagating directions of optical signals are different, input and output of optical signals to and from a multi-core fiber may be performed using any one of the fan-in device and the fan-out device. Moreover, adding of optical signals addressed to a multi-core fiber and dropping of optical signals from the multi-core fiber may be performed simultaneously using one device.

Connectors 150-1 to 150-3 are provided in the Add/Drop nodes 120-1 to 120-3, respectively. A connector 150-$i$ of an Add/Drop node 120-$i$ ($i$=1, 2, 3) is connected to an MCF 200-$i$ and an MCF 200-($i$+1). A connector 150-$i$ drops an optical signal addressed to a subject node among the optical signals added in the transceiving node 110 from the MCF 200-$i$. Moreover, the connector 150-$i$ adds optical signals addressed to the transceiving node 110 to the cores of the MCF 200-($i$+1).

In the Add/Drop node 120-1, the connector 150-1 drops an optical signal addressed to the subject node from the core 201-1 of the MCF 200-1. The connector 150-1 connects the dropped optical signal to the receiving device 122-1. Moreover, the connector 150-1 adds an optical signal generated by the transmitting device 121-1 to the core 201-2 of the MCF 200-2. The optical signal added to the core 201-2 is an optical signal transmitted from the Add/Drop node 120-1 to the transceiving node 110.

The connector 150-1 connects the cores 202-1 and 203-1 among the cores of the MCF 200-1 to the cores 202-2 and 203-2 among the cores of the MCF 200-2. The connector 150-1 relays optical signals between the MCF 200-1 and the MCF 200-2. The connector 150-1 relays optical signals transmitted through cores other than the cores 201-1 and 201-2 that add or drop optical signals.

In the Add/Drop node 120-2, the connector 150-2 drops an optical signal addressed to the subject node from the core 202-2 of the MCF 200-2. The connector 150-2 connects the dropped optical signal to the receiving device 122-2. Moreover, the connector 150-2 adds an optical signal generated by the transmitting device 121-2 to the core 202-3 of the MCF 200-3. The optical signal added to the core 202-3 is an optical signal transmitted from the Add/Drop node 120-2 to the transceiving node 110.

The connector 150-2 connects the cores 201-2 and 203-2 among the cores of the MCF 200-2 to the cores 201-3 and 203-3 among the cores of the MCF 200-3. The connector 150-2 relays optical signals between the MCF 200-2 and the MCF 200-3. The connector 150-2 relays optical signals transmitted through cores other than the cores 201-2 and 201-3 that add or drop optical signals.

In the Add/Drop node 120-3, the connector 150-3 drops an optical signal addressed to the subject node from the core 203-3 of the MCF 200-3. The connector 150-3 connects the dropped optical signal to the receiving device 122-3. Moreover, the connector 150-3 adds an optical signal generated by the transmitting device 121-3 to the core 203-4 of the MCF 200-4. The optical signal added to the core 203-4 is an optical signal transmitted from the Add/Drop node 120-3 to the transceiving node 110.

The connector 150-3 connects the cores 201-3 and 202-3 among the cores of the MCF 200-3 to the cores 201-4 and 202-4 among the cores of the MCF 200-4. The connector 150-3 relays optical signals between the MCF 200-3 and the MCF 200-4. The connector 150-3 relays optical signals transmitted through cores other than the cores 203-3 and 203-4 that add or drop optical signals.

Figure 2A:
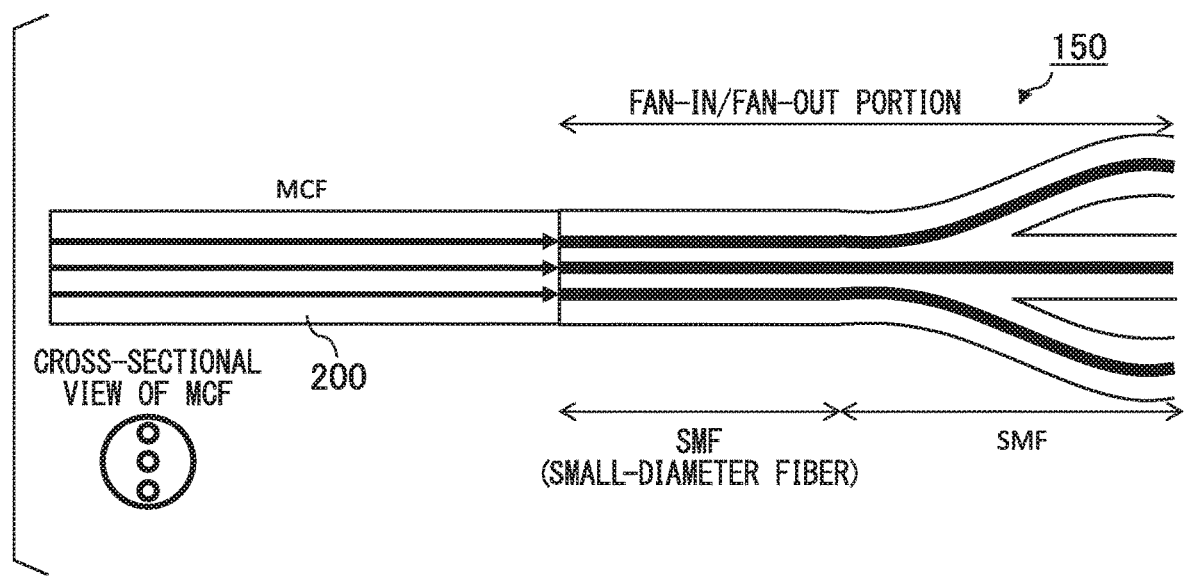
FIG. 2A is a diagram showing a first configuration example of a connector used in a communication system.
Figure 2B:
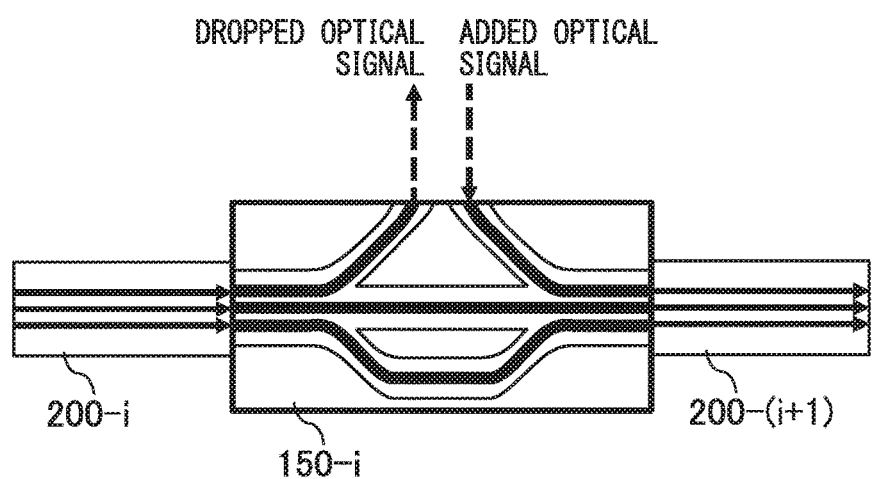
FIG. 2B is a diagram showing the first configuration example of a connector used in a communication system.

FIGS. 2A and 2B are diagrams showing a first configuration example of the connector 150 used in the communication system 100. The connector 150 includes a fan-in/fan-out portion including a plurality of small-diameter single-mode fibers (SMFs) and a plurality of SMFs. As shown in FIG. 2A, the connector 150 includes a small-diameter SMF for each of the cores of a connection target MCF 200. One set of ends of the plurality of small-diameter SMFs are provided at positions facing the cores of the MCF 200. Moreover, the other set of ends of the plurality of small-diameter SMFs are provided at positions facing one set of ends of the SMFs. Each of the small-diameter SMFs connects together the SMF and the core of the MCF 200. The connector 150 can drop optical signals transmitted through the respective cores of the MCF 200 via the small-diameter SMF and the SMF. Moreover, by inputting optical signals to the SMF, it is possible to input optical signals to the cores of the MCF 200.

The connector 150-$i$ shown in FIG. 2B connects the MCF 200-$i$ and the MCF 200-($i$+1). The other set of ends of SMFs corresponding to cores that transmit optical signals that are an Add/Drop target are drawn out to a side surface of the connector 150-$i$. At the other set of ends of the SMFs drawn out to the side surface of the connector 150-$i$, adding and dropping (Add/Drop) of the optical signal can be performed.

The other set of ends of the SMFs corresponding to cores that transmit optical signals which are not the Add/Drop target among the cores of the MCF 200-$i$ and the other set of ends of the SMFs corresponding to cores that transmit optical signals which are not the Add/Drop target among the cores of the MCF 200-($i$+1) are provided at positions facing each other. In the connector 150-$i$, optical signals that are not the Add/Drop target are relayed from the MCF 200-$i$ to the MCF 200-($i$+1) via the small-diameter SMFs and the SMFs.

Figure 3A:
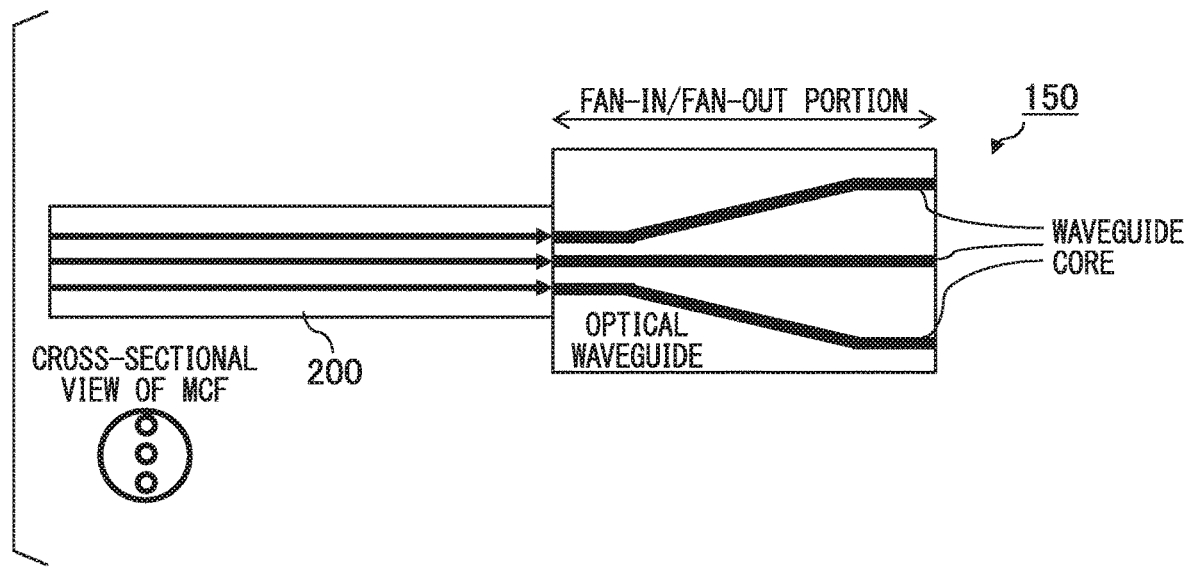
FIG. 3A is a diagram showing a second configuration example of a connector used in a communication system.
Figure 3B:
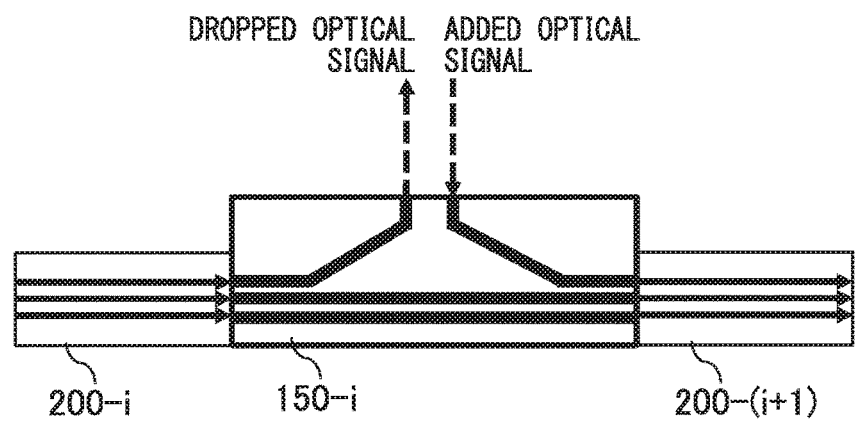
FIG. 3B is a diagram showing the second configuration example of a connector used in a communication system.

FIGS. 3A and 3B are diagrams showing a second configuration example of the connector 150 used in the communication system 100. FIGS. 3A and 3B show a configuration example different from the configuration example of the connector 150 shown in FIGS. 2A and 2B. The connector 150 shown in FIGS. 3A and 3B includes an optical waveguide including a plurality of waveguide cores formed on a glass substrate as a fan-in/fan-out portion. As shown in FIG. 3A, in the connector 150, the plurality of waveguide cores are provided at positions facing the cores of a connection target MCF 200. Optical signals transmitted through the respective cores of the MCF 200 are split via the waveguide cores. Moreover, by adding optical signals to the waveguide cores, it is possible to input optical signals to the respective cores of the MCF 200.

In the connector 150-$i$ shown in FIG. 3B, one set of ends of waveguide cores corresponding to the cores that transmit optical signals which are the Add/Drop target among the cores of the MCF 200-$i$ and the MCF 200-($i$+1) connected by the connector 150-$i$ are provided at positions facing cores of the MCFs. The other set of ends of the waveguide cores are provided on a side surface of the connector 150-$i$. At the other set of ends of the waveguide cores positioned on the side surface of the connector 150-$i$, adding and dropping of optical signals can be performed.

One set of ends of the waveguide cores corresponding to the cores that transmit optical signals that are not the Add/Drop target among the cores of the MCF 200-$i$ are provided at positions facing the cores of the MCFs. The other set of ends of the waveguide cores are provided at positions facing the cores that transmit optical signals that are not the Add/Drop target among the cores of the MCF 200-($i$+1). The cores that transmit optical signals that are not the Add/Drop target in the MCF 200-$i$ and the MCF 200-($i$+1) are connected to waveguide cores in a one-to-one relationship. In the connector 150-$i$, the optical signals that are not the Add/Drop target are relayed from the cores of the MCF 200-$i$ to the cores of the MCF 200-($i$+1) via the waveguide cores.

The waveguide cores may be formed in a three-dimensional space as disclosed in Reference Document 1 as well as being formed in a two-dimensional space of a substrate plane.

[Reference Document 1]

R. R. Thomson, et al., "Ultrafast-laser inscription of a three dimensional fan-out device for multicore fiber coupling applications," Optics Express, OSA Publishing, 2007, Vol. 15, Issue 18, p. 11691-11697

Figure 4A:
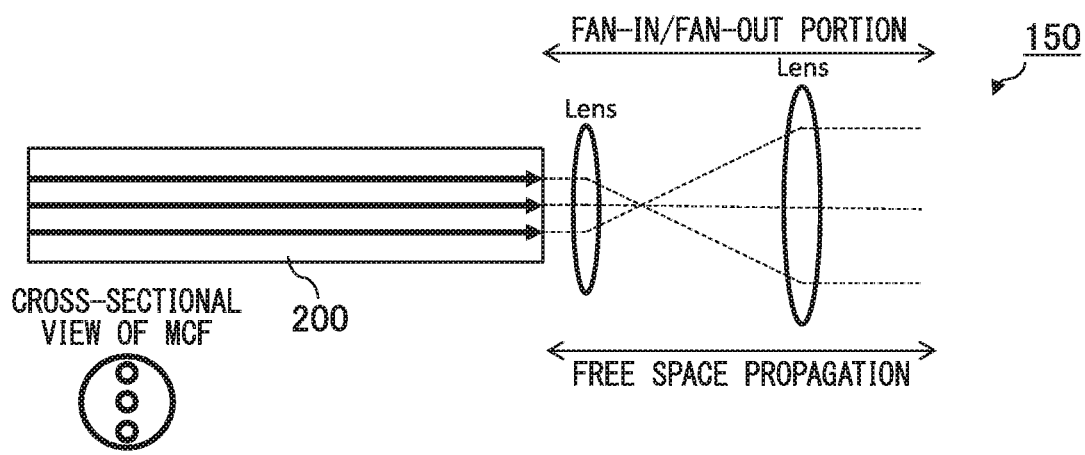
FIG. 4A is a diagram showing a third configuration example of a connector used in a communication system.
Figure 4B:
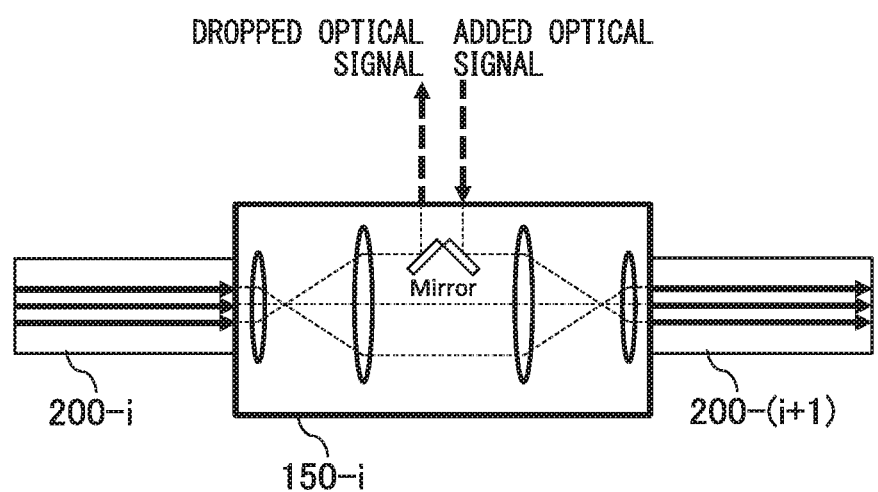
FIG. 4B is a diagram showing the third configuration example of a connector used in a communication system.

FIGS. 4A and 4B are diagrams showing a third configuration example of the connector 150 used in the communication system 100. FIGS. 4A and 4B show a configuration example different from the configuration example of the connector 150 shown in FIGS. 2A, 2B, 3A, and 3B. The connector 150 shown in FIGS. 4A and 4B causes optical signals transmitted through the respective cores of the MCF 200 to be output to a free space and causes the optical signals of the respective cores in the free space to be split by an optical system. For example, as shown in FIG. 4A, the connector 150 includes a fan-in/fan-out portion formed of two lenses. The optical signals transmitted through the respective cores of the MCF 200 are output to the free space and are split by being refracted by the two lenses. Add/Drop of optical signals is performed using an optical system. Connection of two MCFs 200 via a free space is disclosed in Reference Document 2, for example.

[Reference Document 2]

W. Klaus, et al., "Free-Space Coupling Optics for Multicore Fibers," Photonics Technology Letters, IEEE, September 2012, Volume 24, Issue 21, p. 1902-1905

FIG. 4B is a diagram showing a configuration example of the connector 150-$i$. In the connector 150-$i$ shown in FIG. 4B, the optical signals output from the respective cores of the MCF 200-$i$ are collimated by an optical system (a collimator) formed by combining two lenses. Moreover, the collimated optical signals are input to the respective cores of the MCF 200-($i$+1). A mirror that changes an optical path toward a side surface of the connector 150-$i$ is disposed in an optical path of optical signals which are the Add/Drop target. A splitting target optical signal among the optical signals which are converted to parallel light by the optical system is reflected from a mirror and is dropped to the outside of the connector 150-$i$, whereby the splitting target optical signal can be obtained. Moreover, by causing optical signals input from the outside of the connector 150-$i$ to strike the mirror, the optical signals reflected from the mirror are incident on the optical system obtained by combining two lenses together with the collimated optical signals. When the optical signals incident on the optical system are connected to the cores of the MCF 200-($i$+1), Add target optical signals can be added to the cores.

Optical signals that are not the Add/Drop target are bundled together with the added optical signals after being split by the optical system and are input to the respective cores of the MCF 200-($i$+1). In the connector 150-$i$, the optical signals that are not the Add/Drop target are relayed from the MCF 200-$i$ to the MCF 200-($i$+1) via a free space. Although two lenses are used for collimating light output from the fiber and a mirror is used for changing the propagating direction of light in the free space in the drawings, an optical device having the same function may be used.

Although FIGS. 2A, 2B, 3A, 3B, 4A, and 4B show a configuration example of the connector 150, the connector 150 may be realized using a medium and a method other than those described above. For example, a planar lightwave circuit (PLC) having an optical waveguide formed on a silicon may be used as a connector.

In the communication system 100, optical signals generated by the transmitting device 111-1 of the transceiving node 110 are received by the receiving device 122-1 of the Add/Drop node 120-1 via the core 201-1 of the MCF 200-1 and the connector 150-1. The optical signals generated by the transmitting device 111-2 are received by the receiving device 122-2 of the Add/Drop node 120-2 via the core 202-1 of the MCF 200-1, the connector 150-1, the core 202-2 of the MCF 200-2, and the connector 150-2. The optical signals generated by the transmitting device 111-3 are received by the receiving device 122-3 of the Add/Drop node 120-3 via the core 203-1 of the MCF 200-1, the connector 150-1, the core 203-2 of the MCF 200-2, the connector 150-2, the core 203-3 of the MCF 200-3, and the connector 150-3.

Moreover, the optical signals generated by the transmitting device 121-1 of the Add/Drop node 120-1 are received by the receiving device 112-1 of the transceiving node 110 via the connector 150-1, the core 201-2 of the MCF 200-2, the connector 150-2, the core 201-3 of the MCF 200-3, the connector 150-3, and the core 201-4 of the MCF 200-4. The optical signals generated by the transmitting device 121-2 of the Add/Drop node 120-2 are received by the receiving device 112-2 of the transceiving node 110 via the connector 150-2, the core 202-3 of the MCF 200-3, the connector 150-3, and the core 202-4 of the MCF 200-4. The optical signals generated by the transmitting device 121-3 of the Add/Drop node 120-3 are received by the receiving device 112-3 of the transceiving node 110 via the connector 150-3 and the core 203-4 of the MCF 200-4.

In the communication system 100, the transceiving node 110 has communication paths for transmitting and receiving signals to and from the Add/Drop nodes 120-1 to 120-3. The communication system 100 has a star-type logical topology around the transceiving node 110.

For example, by connecting together the MCFs 200 at each node using any one of the connectors 150 shown in FIGS. 2A, 2B, 3A, 3B, 4A, and 4B, it is possible to add and drop optical signal to and from predetermined core among a plurality of cores included in the MCF 200. In the communication system 100, by connecting the MCF 200-$i$ and the MCF 200-($i$+1) via the connector 150-$i$, it is possible to easily drop optical signals addressed to the Add/Drop node 120-$i$ and add optical signals addressed to the transceiving node 110. Since a process of dividing multiplexed optical signals having different wavelengths in respective wavelengths is not required in adding or dropping optical signals, it is possible to reduce the time and labor for installation and maintenance of devices in the Add/Drop node 120.

Although a case in which the MCF 200 has three cores has been described, the MCF 200 may have four or more cores.

When the MCF 200 has four or more cores, optical signals may be added and dropped for two or more cores of the Add/Drop node 120.

Figure 5:
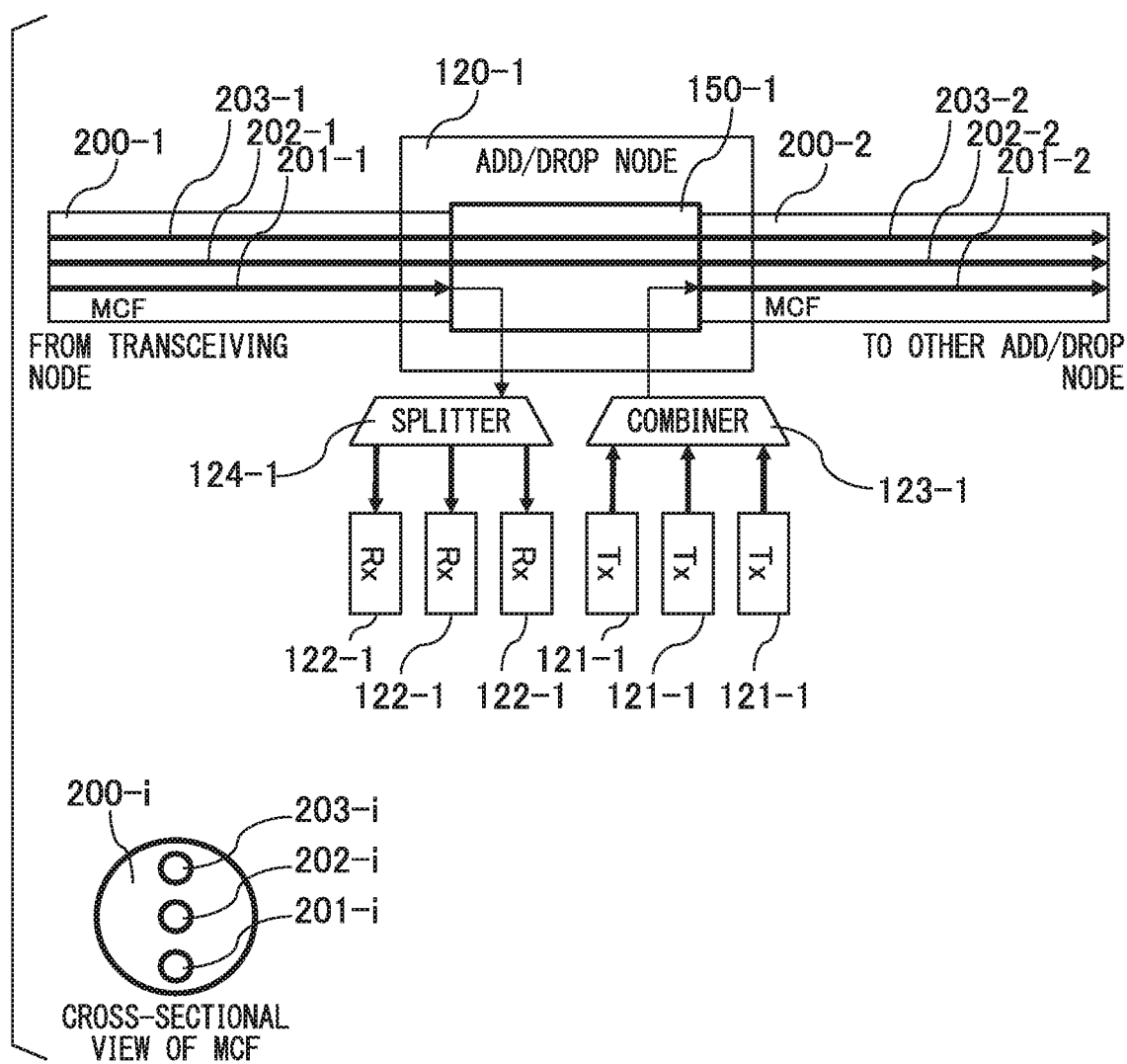
FIG. 5 is a diagram showing a first configuration example of an Add/Drop node when WDM transmission is performed in a communication system.

Moreover, WDM transmission may be performed in each core of the MCF 200. When WDM transmission is performed, optical signals of respective wavelengths need to be split and combined in the Add/Drop node 120. FIG. 5 is a diagram showing a configuration example of the Add/Drop node 120-1 when the communication system 100 performs WDM transmission. The Add/Drop node 120-1 includes a connector 150-1, a splitter 124-1, a combiner 123-1, a plurality of receiving devices 122-1, and a plurality of transmitting devices 121-1.

An optical signal dropped from the core 201-1 of the MCF 200-1 of the connector 150-1 is input to the splitter 124-1. The splitter 124-1 splits the input optical signal in respective wavelengths. The optical signals obtained by splitting are received by the receiving devices 122-1, respectively. The optical signals having different wavelengths generated by the plurality of transmitting devices 121-1 are input to the combiner 123-1. The combiner 123-1 combines the input optical signals and outputs the combined optical signal to the connector 150-1. The connector 150-1 connects the optical signal input from the combiner 123-1 to the core 201-2 of the MCF 200-2 to add the optical signal addressed to the transceiving node 110 to the MCF 200-2.

Even when WDM transmission is performed, the optical signals of the cores 202-1 and 203-1 of the MCF 200-1, which are not the Add/Drop target, are relayed to the cores 202-2 and 203-2 of the MCF 200-2. Due to this, as for optical signals to be relayed, it is not necessary to split and combine optical signals in respective wavelengths at each Add/Drop node. When WDM transmission is performed, the other Add/Drop nodes 120 have a configuration similar to that of the Add/Drop node 120-1.

Figure 6:
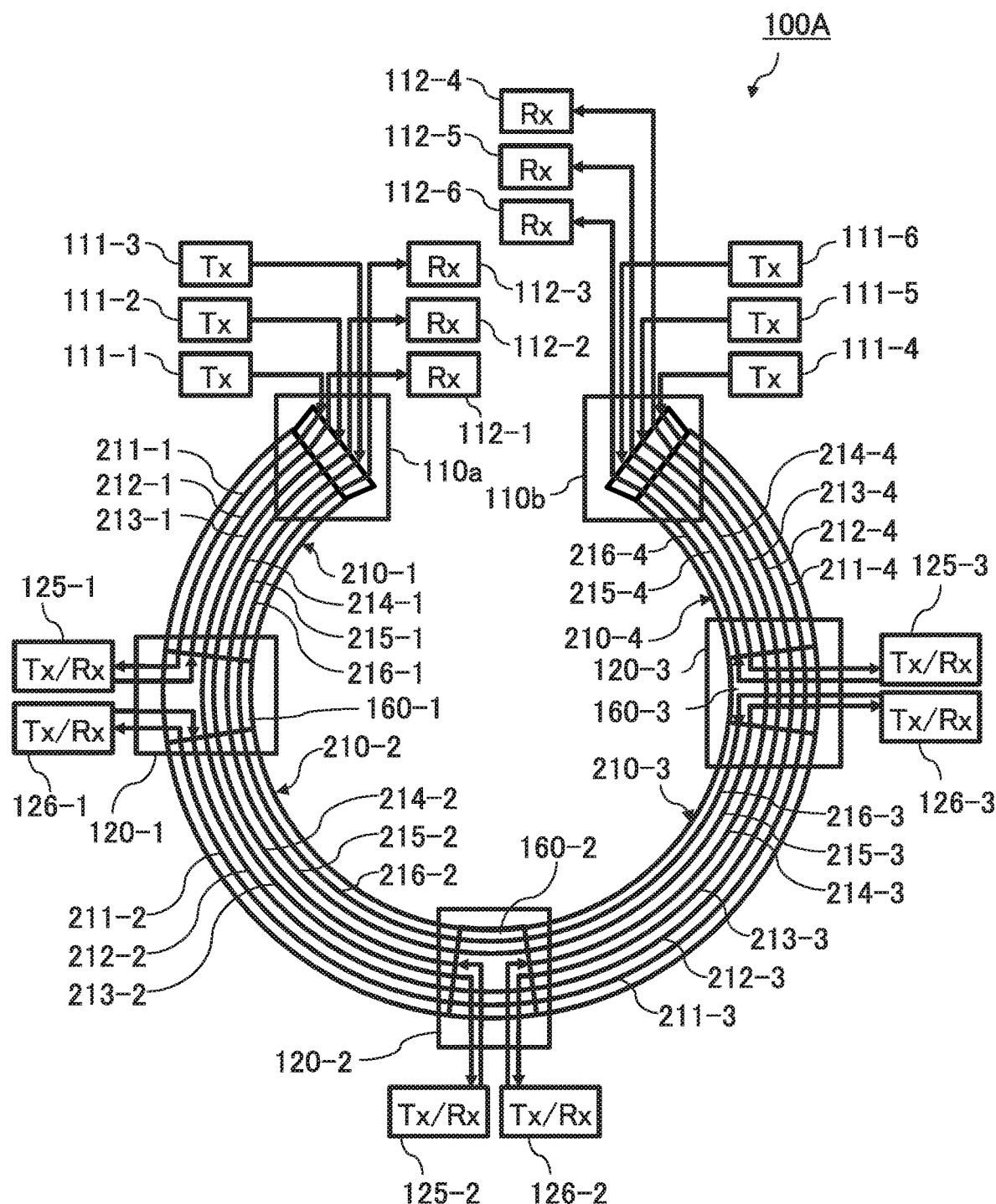
FIG. 6 is a diagram showing a second configuration example of the communication system according to the present invention.

A communication system having a different configuration from the communication system 100 shown in FIG. 1 will be described. FIG. 6 is a diagram showing a configuration example of a communication system 100A which uses the MCF according to the present invention. The communication system 100A includes transceiving nodes 110a and 110b and n Add/Drop nodes 120. FIG. 6 shows a configuration example of the communication system 100A when n=3. The communication system 100A is different from the communication system 100 in that the communication system 100A has a physical topology of a dual-system one-way ring configuration.

Nodes are connected together by MCFs 210-1 to 210-4. The transceiving node 110a and the Add/Drop node 120-1 are connected together by the MCF 210-1. The Add/Drop node 120-1 and the Add/Drop node 120-2 are connected together by the MCF 210-2. The Add/Drop node 120-2 and the Add/Drop node 120-3 are connected together by the MCF 210-3. The Add/Drop node 120-3 and the transceiving node 110b are connected together by the MCF 210-4. The MCFs 210-1 to 210-4 of the communication system 100A include six cores 211 to 216.

When the description of the configuration of the communication system 100A is generalized, an Add/Drop node 120-$i$ ($1 \leq i \leq n-1$) is connected to an Add/Drop node 120-($i$+1) by an MCF 210-($i$+1). The MCF 210-1 connects together the transceiving node 110a and the Add/Drop node 120-1. The MCF 210-($n$+1) connects together the Add/Drop node 120-$n$ and the transceiving node 110b.

Each node of the communication system 100A includes either a transmitting device (Tx) and a receiving device (Rx) that perform communication between nodes or a transceiving device (Tx/Rx). Transmitting devices 111-1 to 111-3 and receiving devices 112-1 to 112-3 are provided in the transceiving node 110a. Transceiving devices 125-1 and 126-1 are provided in the Add/Drop node 120-1. Transceiving devices 125-2 and 126-2 are provided in the Add/Drop node 120-2. Transceiving devices 125-3 and 126-3 are provided in the Add/Drop node 120-3. Transmitting devices 111-4 to 111-6 and receiving devices 112-4 to 112-6 are provided in the transceiving node 110b. In the configuration example of the communication system 100A shown in FIG. 6, a configuration in which the transmitting device 111 and the receiving device 112 are provided in the transceiving nodes 110a and 110b, and the transceiving devices 125 and 126 are provided in the Add/Drop nodes 120-1 to 120-3 will be described. However, the transceiving devices 125 and 126 have the functions of both a transmitting device and a receiving device therein, and there is no great difference between the transceiving device and a combination of the transmitting device and the receiving device. Either a transmitting device and a receiving device or a transceiving device may be provided in the transceiving nodes 110a and 110b and the Add/Drop nodes 120-1 to 120-3.

The transmitting devices 111-1 to 111-3 generate optical signals to be transmitted to the Add/Drop nodes 120-1 to 120-3, respectively. The optical signals generated by the transmitting devices 111-1 to 111-3 are added to the cores 211-1, 213-1, and 215-1 of the MCF 210-1, respectively. The receiving devices 112-1 to 112-3 receive optical signals transmitted from the Add/Drop nodes 120-1 to 120-3 to the transceiving node 110a, respectively. The receiving devices 112-1 to 112-3 receive optical signals from the cores 212-1, 214-1, and 216-1 of the MCF 210-1, respectively.

The transmitting devices 111-4 to 111-6 generate optical signals to be transmitted to the Add/Drop nodes 120-1 to 120-3, respectively. The optical signals generated by the transmitting devices 111-4 to 111-6 are added to the cores 211-4, 213-4, and 215-4 of the MCF 210-4, respectively. The receiving devices 112-4 to 112-6 receive optical signals transmitted from the Add/Drop nodes 120-1 to 120-3 to the transceiving node 110b, respectively. The receiving devices 112-4 to 112-6 receive optical signals from the cores 212-4, 214-4, and 216-4 of the MCF 210-4, respectively. In the transceiving nodes 110a and 110b, a fan-in device or a fan-out device is used for adding optical signals to the MCF 200 and dropping optical signals from the MCF 200.

A connector 160-$i$ is provided in each Add/Drop node 120-$i$ ($i$=1, 2, 3). The connector 160-$i$ is connected to the MCF 210-$i$ and the MCF 210-($i$+1). The connector 160-$i$ drops optical signals addressed to the subject node among the optical signals added in the transceiving nodes 110a and 110b from the MCF 210-$i$ and the MCF 210-($i$+1). The connector 160-$i$ adds an optical signal addressed to the transceiving node 110a to the cores of the MCF 210-$i$. The connector 160-$i$ adds an optical signal addressed to the transceiving node 110b to the cores of the MCF 210-($i$+1).

In the Add/Drop node 120-1, the connector 160-1 drops an optical signal addressed to the subject node from the core 211-1 of the MCF 210-1. The connector 160-1 connects the dropped optical signal to the transceiving device 125-1. Moreover, the connector 160-1 adds an optical signal generated by the transceiving device 125-1 to the core 212-1 of the MCF 210-1. The optical signal added to the core 212-1 is an optical signal which is transmitted from the subject node to the transceiving node 110a.

Furthermore, the connector 160-1 drops an optical signal addressed to the subject node from the core 211-2 of the MCF 210-2. The connector 160-1 connects the dropped optical signal to the transceiving device 126-1. Moreover, the connector 160-1 adds an optical signal generated by the transceiving device 126-1 to the core 212-2 of the MCF 210-2. The optical signal added to the core 212-2 is an optical signal that is transmitted from the subject node to the transceiving node 110b.

The connector 160-1 connects the cores 213-1 to 216-1 among the cores of the MCF 210-1 to the cores 213-2 to 216-2 among the cores of the MCF 210-2, respectively. The connector 160-1 relays optical signals between the MCF 210-1 and the MCF 210-2. The connector 160-1 relays optical signals transmitted through cores other than the cores 211-1, 212-1, 211-2, and 212-2 through which optical signals are added or dropped.

In the Add/Drop node 120-2, the connector 160-2 drops an optical signal addressed to the subject node from the core 213-2 of the MCF 210-2. The connector 160-2 connects the dropped optical signal to the transceiving device 125-2. Moreover, the connector 160-2 adds an optical signal generated by the transceiving device 125-2 to the core 214-2 of the MCF 210-2. The optical signal added to the core 214-2 is an optical signal which is transmitted from the subject node to the transceiving node 110a.

Furthermore, the connector 160-2 drops an optical signal addressed to the subject node from the core 213-3 of the MCF 210-3. The connector 160-2 connects the dropped optical signal to the transceiving device 126-2. Moreover, the connector 160-2 adds an optical signal generated by the transceiving device 126-2 to the core 214-3 of the MCF 210-3. The optical signal added to the core 214-3 is an optical signal that is transmitted from the subject node to the transceiving node 110b.

The connector 160-2 connects the cores 211-2, 212-2, 215-2, and 216-2 among the cores of the MCF 210-2 to the cores 211-3, 212-3, 215-3, and 216-3 among the cores of the MCF 210-3, respectively. The connector 160-2 relays optical signals between the MCF 210-2 and the MCF 210-3. The connector 160-2 relays optical signals transmitted through cores other than the cores 213-2, 214-2, 213-3, and 214-3 through which optical signals are added or dropped.

In the Add/Drop node 120-3, the connector 160-3 drops an optical signal addressed to the subject node from the core 215-3 of the MCF 210-3. The connector 160-3 connects the dropped optical signal to the transceiving device 126-3. Moreover, the connector 160-3 adds an optical signal generated by the transceiving device 126-3 to the core 216-3 of the MCF 210-3. The optical signal added to the core 216-3 is an optical signal that is transmitted from the subject node to the transceiving node 110a.

Furthermore, the connector 160-3 drops an optical signal addressed to the subject node from the core 215-4 of the MCF 210-4. The connector 160-4 connects the dropped optical signal to the transceiving device 125-3. Moreover, the connector 160-3 adds an optical signal generated by the transceiving device 125-3 to the core 216-4 of the MCF 210-4. The optical signal added to the core 216-4 is an optical signal that is transmitted from the subject node to the transceiving node 110b.

The connector 160-3 connects the cores 211-3 to 214-3 among the cores of the MCF 210-3 to the cores 211-4 to 214-4 among the cores of the MCF 210-4, respectively. The connector 160-3 relays optical signals between the MCF 210-3 and the MCF 210-4. The connector 160-3 relays optical signals transmitted through cores other than the cores 215-3, 216-3, 215-4, and 216-4 through which optical signals are added or dropped.

The connectors 160-1 to 160-3 of the communication system 100A can be configured similarly to the connectors 150-1 to 150-3 of the communication system 100 by using the small-diameter fiber, the optical waveguide, the optical system, and the like as shown in FIGS. 2A, 2B, 3A, 3B, 4A, and 4B.

In the communication system 100A, a transmission communication path and a reception communication path are formed between the transceiving nodes 110a and 110b and the Add/Drop nodes 120-1 to 120-3. The transceiving nodes 110a and 110b can communicate with the Add/Drop nodes 120-1 to 120-3 individually. In this manner, the communication system 100A has a tree-type logical topology in which the transceiving nodes 110a and 110b are used as root nodes.

The Add/Drop nodes 120-1 to 120-3 may use any one of the communication paths between the two transceiving nodes 110a and 110b as an active system (0-system) and use the other as a standby system (1-system). Moreover, the Add/Drop nodes 120-1 to 120-3 may use a communication path of the shorter transmission path as the 0-system and use a communication path of the longer transmission path as the 1-system. In the Add/Drop nodes 120-1 to 120-3, since a process of dividing multiplexed optical signals having different wavelengths in respective wavelengths is not required in adding or dropping optical signals, it is possible to reduce the time and labor for installation and maintenance of devices.

Although a case in which each MCF 210 has six cores 211 to 216 has been described, the MCF 210 may have seven or more cores. When the MCF 210 has seven or more cores, optical signals may be added and dropped for two or more cores of the Add/Drop node 120.

Moreover, WDM transmission may be performed in each core of the MCF 210. When WDM transmission is performed, as shown in FIG. 5, a splitter or a combiner for optical signals to be added or dropped is provided in each Add/Drop node 120.

Moreover, the transceiving node 110a and the transceiving node 110b may be connected together using the MCF 210 or a MCF having seven or more cores. In the communication system 100A, when the roles of the transceiving nodes 110a and 110b and the Add/Drop nodes 120-1 to 120-3 are changed, a logical topology can be easily changed by attaching a connector to the transceiving nodes 110a and 110b and replacing the connector 150 of each of the Add/Drop nodes 120-1 to 120-3 with another connector. In this way, it is possible to flexibly cope with a change in the network configuration.

Figure 7:
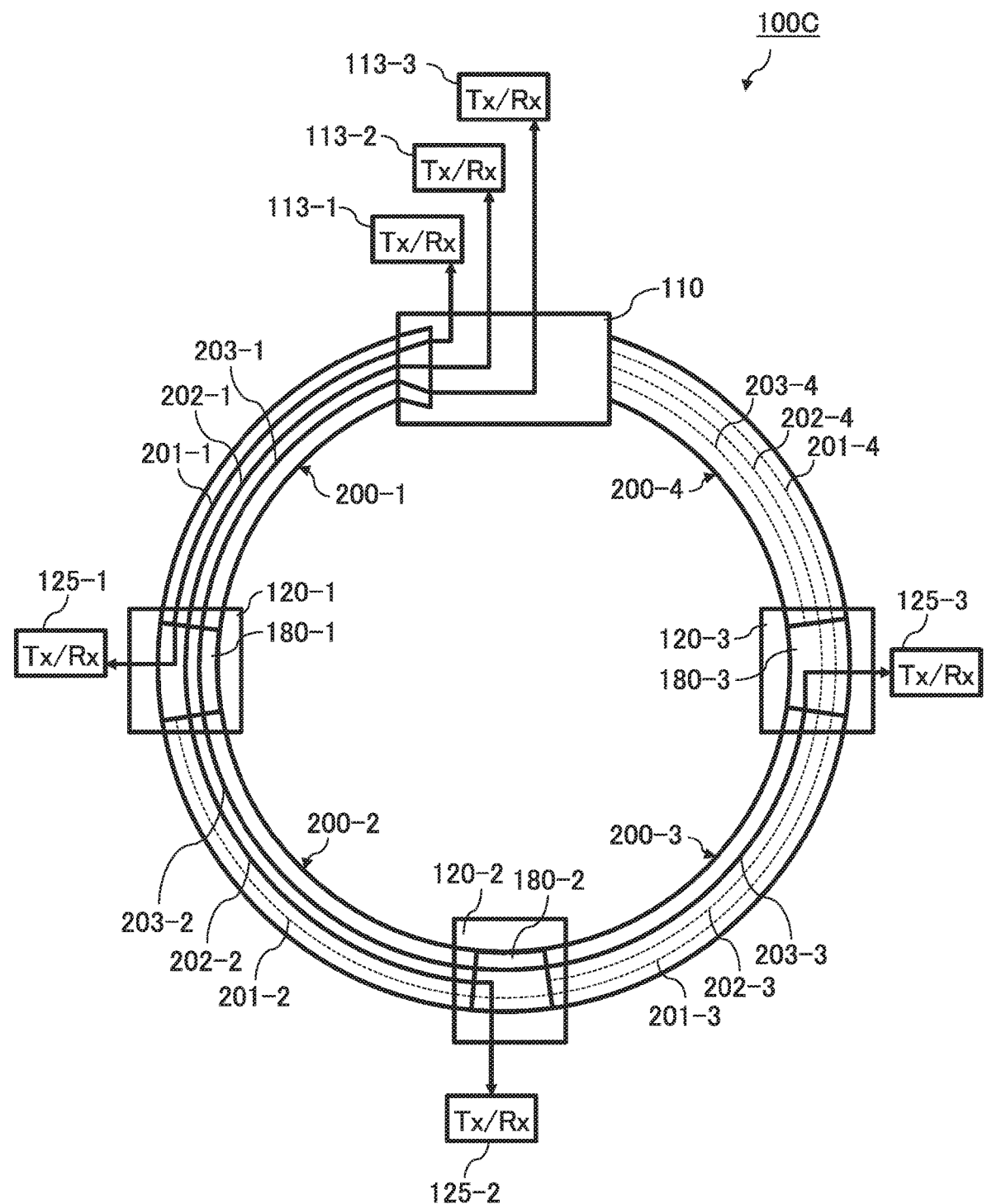
FIG. 7 is a diagram showing a third configuration example of the communication system according to the present invention.

A communication system having a different configuration from the communication systems shown in FIGS. 1 and 6 will be described. FIG. 7 is a diagram showing a configuration example of a communication system 100C which uses the MCF according to the present invention. The communication system 100C includes a transceiving node 110 and n Add/Drop nodes 120. FIG. 7 shows a configuration example of the communication system 100C when n=3. In the communication system 100C, the connection of MCFs 200-1 to 200-4 between nodes is similar to the connection in the communication system 100 shown in FIG. 1. In the communication system 100C, communication from the transceiving node 110 to the respective Add/Drop node 120 and communication from the respective Add/Drop nodes 120 to the transceiving node 110 are performed using the same core. When optical signals of which the transmission directions are different are transmitted using the same core, the strength of optical signals may be suppressed to a certain level or lower in order to suppress the influence of different optical signals of which the transmission directions are different and the wavelengths of optical signals may be different in respective transmission directions. The communication system 100C is different from the communication system 100 of the first embodiment in that the communication system 100C has a physical topology of a single-system two-way ring configuration.

Each node of the communication system 100C includes a transceiving device (Tx/Rx) that performs communication between nodes. Transceiving devices 113-1 to 113-3 are provided in the transceiving node 110. Transceiving devices 125-1 to 125-3 are provided in the Add/Drop nodes 120-1 to 120-3, respectively. The transceiving devices 113-1 to 113-3 generate optical signals to be transmitted to the Add/Drop nodes 120-1 to 120-3, respectively. Moreover, the transceiving devices 113-1 to 113-3 receive optical signals transmitted from the Add/Drop nodes 120-1 to 120-3, respectively, and acquire information included in the optical signals. The transceiving devices 125-1 to 125-3 generate optical signals to be transmitted to the transceiving node 110. Moreover, the transceiving devices 125-1 to 125-3 receive optical signals transmitted from the transceiving node 110 and acquire information included in the optical signals.

The transceiving devices 113-1 to 113-3 generate optical signals to be transmitted to the Add/Drop nodes 120-1 to 120-3, respectively. Three optical signals generated by the transceiving devices 113-1 to 113-3 are added to the cores 201-1 to 203-1 of the MCF 200-1, respectively. Moreover, the transceiving devices 113-1 to 113-3 receive optical signals from the Add/Drop nodes 120-1 to 120-3 via the cores 201-1 to 203-1 of the MCF 200-1, respectively. A fan-in device or a fan-out device is used for adding optical signals to the MCF 200-1 and dropping optical signals from the MCF 200-1.

A connector 180-$i$ is provided in each Add/Drop node 120-$i$ ($i$=1, 2, 3). The connector 180-$i$ is connected to the MCF 200-$i$ and the MCF 200-($i$+1). The connector 180-$i$ drops an optical signal from the core 20$i$-$i$ of the MCF 200-$i$ and connects the dropped optical signal to the transceiving device 125-$i$. Moreover, the connector 180-$i$ adds an optical signal generated by the transceiving device 125-$i$ to the core 20$i$-$i$ of the MCF 200-$i$. The optical signal generated by the transceiving device 125-$i$ is an optical signal transmitted from the Add/Drop node 120-$i$ to the transceiving node 110. The connector 180-$i$ connects the cores 20$i$-$i$ and 20$i$-($i$+1) other than the Add/Drop target cores among the cores of the MCF 200-$i$ and the cores of the MCF 200-($i$+1) to relay optical signals.

The transceiving node 110 and the Add/Drop node 120-1 perform two-way communication using a communication path formed by the core 201-1. The transceiving node 110 and the Add/Drop node 120-2 perform two-way communication using a communication path formed by the cores 202-1 and 202-2. The transceiving node 110 and the Add/Drop node 120-3 perform two-way communication using a communication path formed by the cores 203-1, 203-2, and 203-3. The core 201-2 of the MCF 200-2, the cores 201-3 and 202-3 of the MCF 200-3, and the cores 201-4 to 203-4 of the MCF 200-4 are cores that are not used in communication.

In the communication system 100C, the Add/Drop node 120-3 may perform communication with the transceiving node 110 using the core 201-4 of the MCF 200-4 to shorten a communication path. In this case, a fan-in device and fan-out device are necessary in a connecting portion with the MCF 200-4 in the transceiving node 110.

Figure 8:
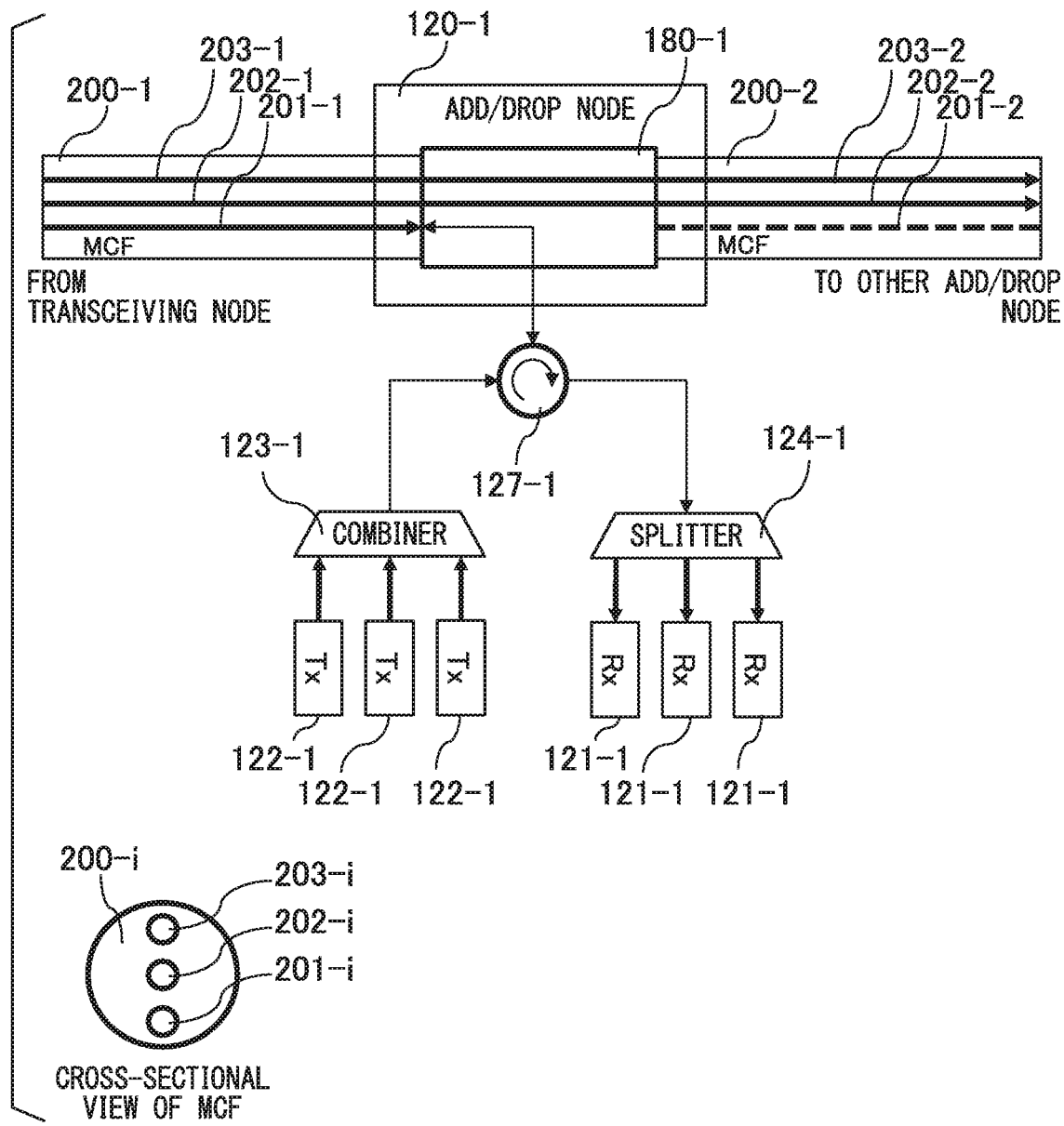
FIG. 8 is a diagram showing a second configuration example of an Add/Drop node when WDM transmission is performed in a communication system.

Moreover, in the communication system 100C, WDM transmission may be performed between the transceiving node 110 and each of the Add/Drop nodes 120-1 to 120-3. When WDM transmission is performed as shown in FIG. 5, it is necessary to split an optical signal dropped from the core in each of the Add/Drop node 120-1 to 120-3 into optical signals of respective wavelengths and combine the optical signals of the respective wavelengths to one optical signal. FIG. 8 is a diagram showing a configuration example of the Add/Drop node 120-1 when the communication system 100C performs WDM transmission. The Add/Drop node 120-1 includes a connector 180-1, an optical circulator 127-1, a splitter 124-1, a combiner 123-1, and a plurality of receiving devices 122-1 and a plurality of transmitting devices 121-1 as the transceiving device 125-1.

An optical signal dropped from the core 201-1 of the MCF 200-1 in the connector 180-1 is connected to the optical circulator 127-1. The optical signal connected from the connector 180-1 to the optical circulator 127-1 is output to the splitter 124-1. The splitter 124-1 splits the input optical signal in respective wavelengths and outputs the optical signals obtained by splitting to the receiving device 122-1. Optical signals having different wavelengths generated by the plurality of transmitting devices 121-1 are input to the combiner 123-1. The combiner 123-1 combines the input optical signals and outputs the optical signal obtained by combining to the optical circulator 127-1. The optical signal input from the combiner 123-1 to the optical circulator 127-1 is output to the connector 180-1. The connector 180-1 adds the optical signal from the optical circulator 127-1 to the core 201-1 of the MCF 200-1 whereby an optical signal addressed to the transceiving node 110 is added to the MCF 200-1.

Even when WDM transmission is performed, the optical signals of the cores 202-1 and 203-1 of the MCF 200-1, which are not the Add/Drop target, are relayed to the cores 202-2 and 203-2 of the MCF 200-2. The other Add/Drop nodes 120 have a configuration similar to that of the Add/Drop node 120-1.

In the communication system 100C, although a case in which one core is the Add/Drop target in each of the Add/Drop node 120 has been described, optical signals may be dropped from a plurality of cores in each of the Add/Drop nodes 120 and optical signals may be added to a plurality of cores.

When a transceiving device in which the transmitting device 121-1 and the receiving device 122-1 are integrated is used (that is, when the transceiving device has an optical circulator therein), it is not necessary to have the optical circulator 127-1. Since it is not necessary to provide two optical components of a transmission-side combiner and a reception-side splitter, it is possible to reduce the number of optical components in each Add/Drop node 120. Examples of an optical component used for combining and splitting include an array wavelength grating (AWG; a wavelength combining and splitting element).

Figure 9:
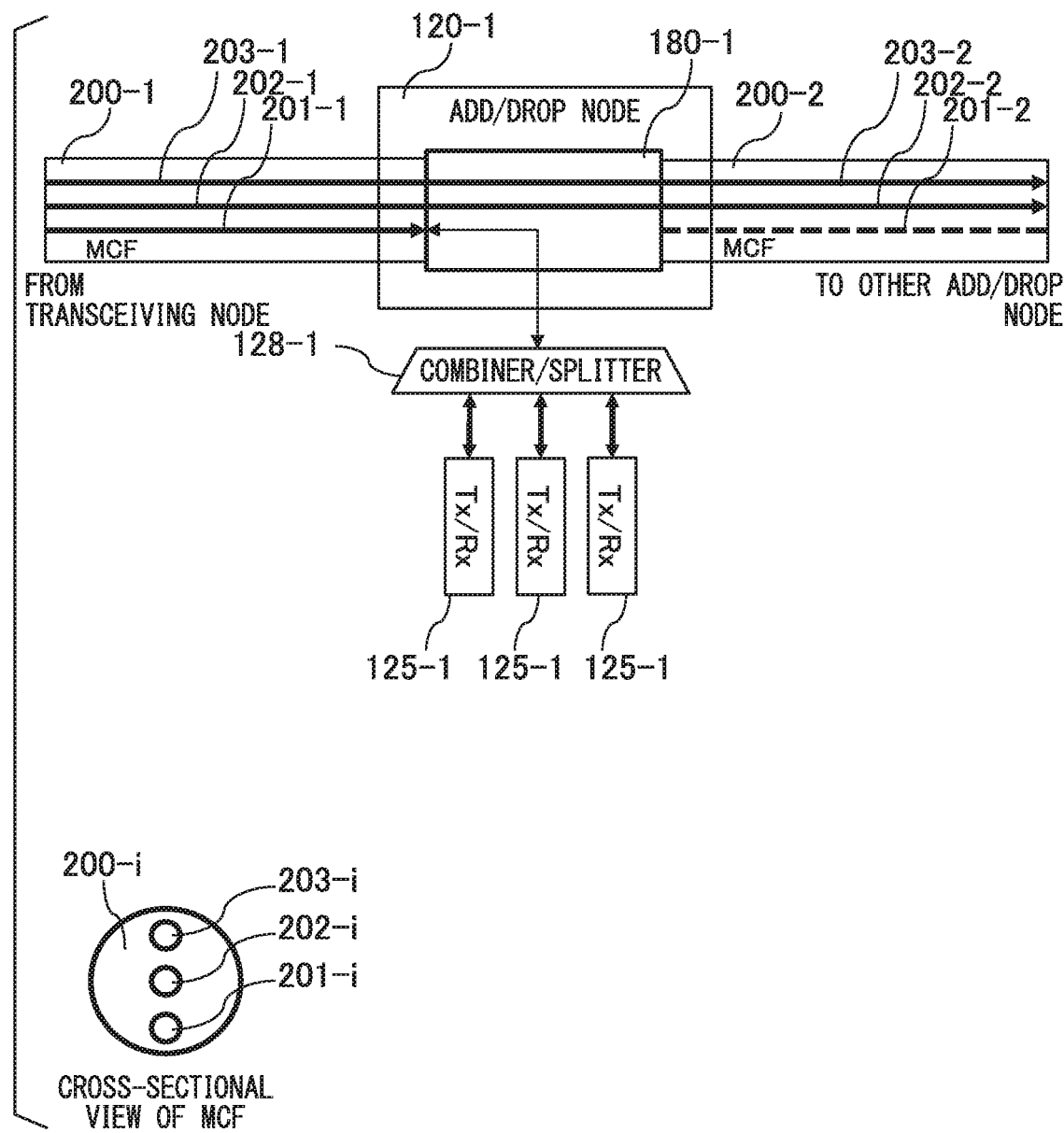
FIG. 9 is a diagram showing a third configuration example of an Add/Drop node when WDM transmission is performed in a communication system.

FIG. 9 is a diagram showing another configuration example of the Add/Drop node 120-1 when the communication system 100C performs WDM transmission. The Add/Drop node 120-1 includes a connector 180-1, a combiner/splitter 128-1, and a plurality of transceiving devices 125-1. The plurality of transceiving devices 125-1 are provided for respective wavelengths. The Add/Drop node 120-1 shown in FIG. 9 has a configuration in which the transmitting device 121-1 and the receiving device 122-1 in the configuration of the Add/Drop node 120-1 shown in FIG. 8 are replaced with the transceiving device 125-1. In the Add/Drop node 120-1 shown in FIG. 8, the transceiving device 125-1 may be provided instead of the transmitting device 121-1 and the receiving device 122-1. In this case, the transmitting function or the receiving function of the transceiving device 125-1 may not be used.

Figure 10:
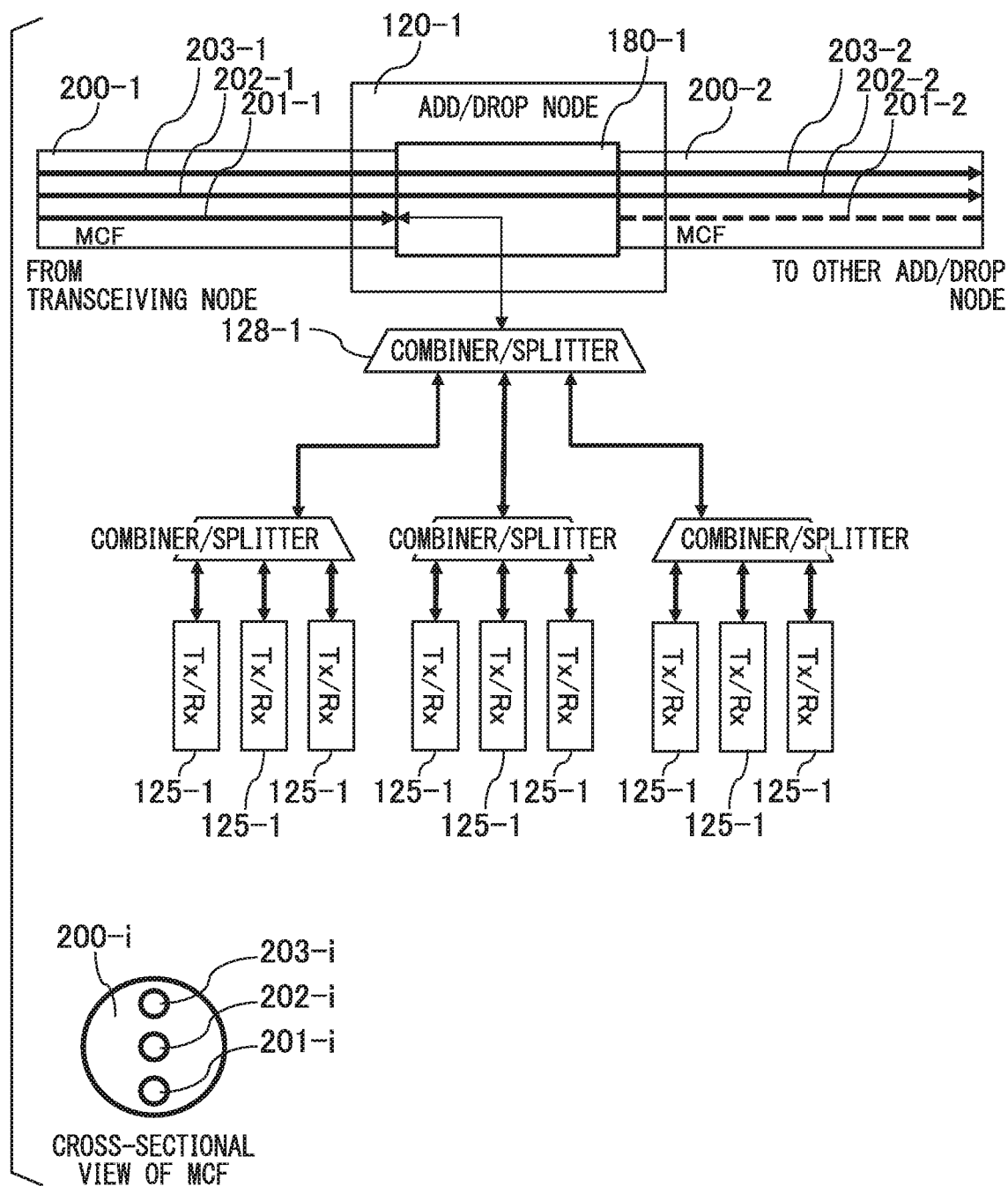
FIG. 10 is a diagram showing a configuration example in which multiple stages of combiners/splitters are used in the Add/Drop node.

When there are many optical signals of different wavelengths to be multiplexed when WDM transmission is performed, a plurality of stages of combiners/splitters may be combined. FIG. 10 is a diagram showing a configuration example in which multiple stages of combiners/splitters are used in the Add/Drop node 120. The Add/Drop node 120-1 includes a connector 180-1, a plurality of combiners/splitters 128-1, and a plurality of transceiving devices 125-1. An optical signal dropped from the core 201-1 by the connector 180-1 is divided into three optical signals in the combiner/splitter 128-1 on the first stage. The three optical signals are split in the combiner/splitter 128-1 on the second stage. The optical signals obtained by splitting are input to the transceiving devices 125-1 of the corresponding wavelengths. Moreover, the optical signals output from the respective transceiving devices 125-1 are combined in the combiner/splitter 128-1 on the second stage and are further combined into one optical signal in the combiner/splitter 128-1 on the first stage, and the optical signal is output to the connector 180-1.

Since optical signals are added or dropped in respective cores in the Add/Drop node 120, signal deterioration such as signal contraction can be avoided as compared to when optical signals are added or dropped in respective wavelengths. Due to this, even when splitting and combining are performed in multiple stages as shown in FIG. 10, it is possible to suppress signal deterioration due to splitting and combining to be within an allowable range and to increase a transmission capacity in respective cores according to the number of optical signals to be multiplexed.

Three communication systems 100, 100A, and 100C have been described as a communication system to which the connector according to an embodiment of the present invention can be applied. In the respective communication systems, a configuration in which an MCF is used for a partial segment or a plurality of segments of the connection between nodes has been described. However, a fault detection method described in the respective embodiments may be applied to a communication system in which a single core fiber (SCF) is used for connection between nodes. When the SCF is used for connection between nodes, a conversion connector for connecting the MCF and a plurality of SCFs or a conversion connector for connecting a connector and a plurality of SCFs is used.

Figure 11:
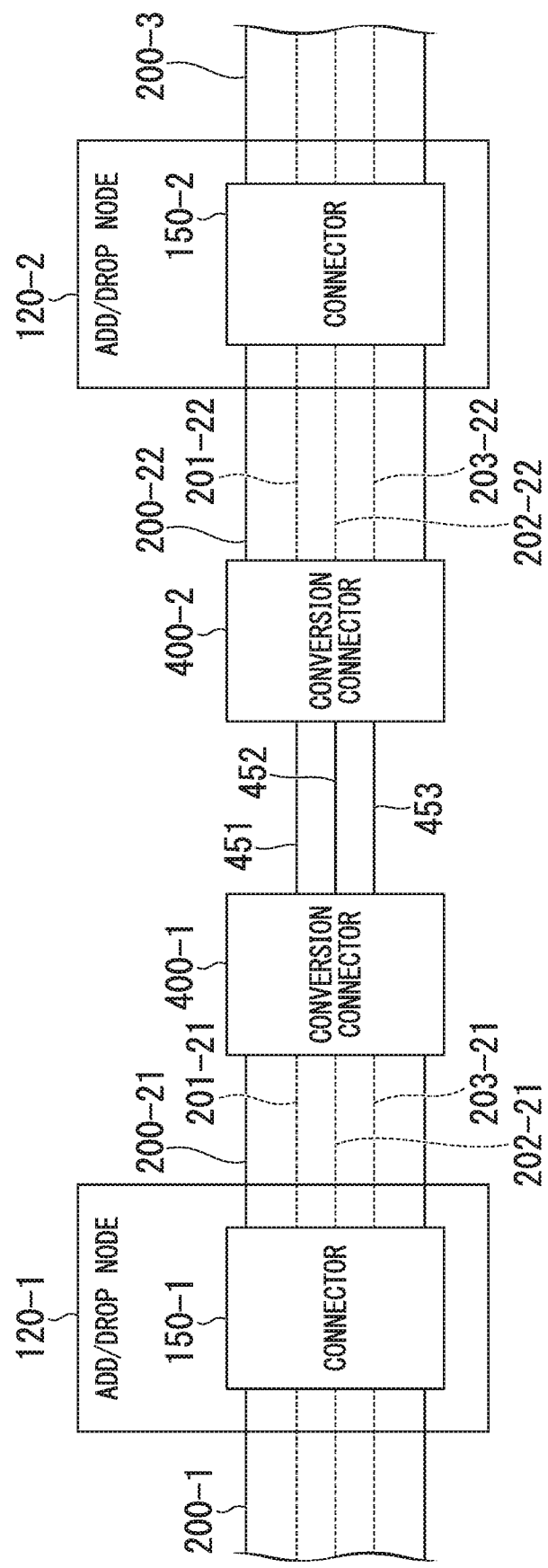
FIG. 11 is a diagram showing a first configuration example of the communication system shown in FIG. 1, in which a plurality of SCFs is used in a partial segment of the connection between Add/Drop nodes.

FIG. 11 is a block diagram showing a first configuration example of the communication system 100 shown in FIG. 1 in which a plurality of SCFs 451, 452, and 453 are used in a partial segment of the connection between the Add/Drop node 120-1 and the Add/Drop node 120-2. The SCFs 451, 452, and 453 are used between an MCF 200-21 connected to a connector 150-1 and an MCF 200-22 connected to a connector 150-2.

A conversion connector 400-1 is used for connection between the MCF 200-21 and the SCFs 451 to 453. The conversion connector 400-1 connects cores 201-21, 202-21, 203-21 of the MCF 200-21 and the SCFs 451, 452, and 453, respectively. A conversion connector 400-2 is used for the connection between the MCF 200-22 and the SCFs 451 to 453. The conversion connector 400-2 connects cores 201-22, 202-22, and 203-22 of the MCF 200-22 and the SCFs 451, 452, and 453, respectively.

The conversion connectors 400-1 and 400-2 have a configuration similar to that of a fan-in device or a fan-out device. By using the conversion connectors 400-1 and 400-2, it is possible to use the SCF in a partial segment of the connection between nodes.

Figure 12:
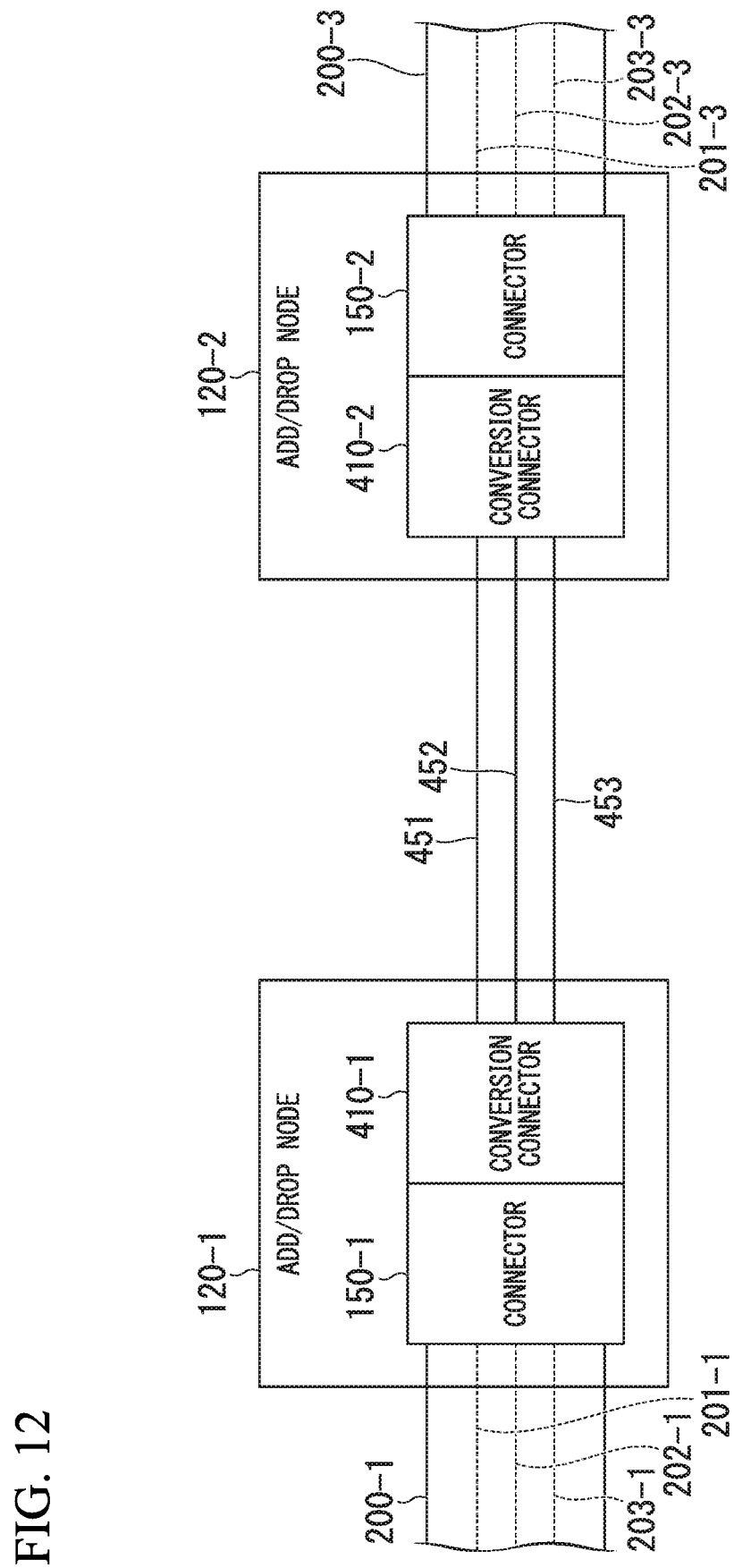
FIG. 12 is a diagram showing a second configuration example of the communication system shown in FIG. 1, in which a plurality of SCFs is used in the connection between Add/Drop nodes.

FIG. 12 is a block diagram showing a second configuration example of the communication system 100 shown in FIG. 1 in which a plurality of SCFs 451, 452, and 453 are used in the connection between the Add/Drop node 120-1 and the Add/Drop node 120-2. The SCFs 451, 452, and 453 are used for the connection between the connector 150-1 and the connector 150-2. The configuration example shown in FIG. 12 is different from the configuration example shown in FIG. 11 in that an MCF is not used for the connection between the Add/Drop nodes 120-1 and 120-2.

The Add/Drop node 120-1 further includes a conversion connector 410-1. The conversion connector 410-1 is attached to a side of the connector 150-1 close to the Add/Drop node 120-2. The Add/Drop node 120-2 further includes a conversion connector 410-2. The conversion connector 410-2 is attached to a side of the connector 150-2 close to the Add/Drop node 120-1. The SCFs 451 to 453 of the same number as the number of cores of the MCF 200 are used for the connection between the conversion connectors 410-1 and 410-2.

The conversion connector 410-1 connects together the SCFs 451, 452, and 453 and the connector 150-1. The connector 150-1 performs input/output of optical signal to/from the conversion connector 410-1 instead of the MCF 200-2. The connector 150-1 connects together the cores 202-1 and 203-1 of the MCF 200-1 and the SCFs 452 and 453, respectively, via the conversion connector 410-1. The conversion connector 410-1 adds an optical signal generated by the transmitting device 121-1 to the SCF 451 via the connector 150-1.

The conversion connector 410-2 connects together the SCFs 451, 452, and 453 and the connector 150-2. The connector 150-2 performs input/output of optical signal to/from the conversion connector 410-2 instead of the MCF 200-2. The connector 150-2 connects together the SCF 451 and 453 and the cores 201-3 and 203-3 of the MCF 200-3, respectively, via the conversion connector 410-2. The connector 150-2 connects an optical signal dropped from the SCF 453 to the receiving device 122-2 via the conversion connector 410-2.

The conversion connectors 410-1 and 410-2 has a configuration similar to that of a fan-in device or a fan-out device. By using the conversion connectors 410-1 and 410-2, it is possible to use the SCF for the connection between nodes.

FIGS. 11 and 12 show a configuration example in which nodes are connected together using the SCF instead of the MCF 200 having three cores. A SCF may be used for the connection between nodes instead of the MCF having two cores or four or more cores. In this case, similarly, a conversion connector is used.

FIGS. 11 and 12 show an example in which a SCF is used for the connection between the Add/Drop nodes 120-1 and 120-2 of the communication system 100 shown in FIG. 1. The SCF may be used for the connection between other nodes. In this case, the conversion connector 400 may be used for the connection between one set of nodes and the conversion connector 410 may be used for the connection between the other set of nodes. Moreover, a combination of the conversion connector 400 that is configured to connect an MCF and a SCF and the conversion connector 410 connected to the connector 150 may be used for the connection between one set of nodes. For example, the conversion connector 400 may be used in the Add/Drop node 120-1, and the conversion connector 410 may be used in the Add/Drop node 120-2.

MCF and SCF may be switched a plurality of times for the connection between one set of nodes. For example, MCF and SCF may be used for the connection between the Add/Drop nodes 120-1 and 120-2 in the order of MCF, SCF, MCF, SCF, and MCF. In this case, a conversion connector is used for each between the MCF and the SCF.

The connector 150-1 and the conversion connector 410-1 described in FIG. 12 may be configured as one connector. Similarly, the connector 150-2 and the conversion connector 410-2 may be configured as one connector. That is, a connector connected to the MCF and the plurality of SCFs may add or drop optical signal to or from the MCF or the SCF and may relay optical signals between the MCF and the SCF.

As described above, the SCF may be used in one or a plurality of connections between the nodes in the communication system 100 shown in FIG. 1 and the other communication systems.

First Embodiment

In a communication system of a first embodiment, a fault detection optical signal is constantly transmitted by a specific core among a plurality of cores of an MCF, an optical signal of the core is acquired in each node, and the presence of a fault is determined. When a fault is detected, a fault location based on an acquisition state of the fault detection optical signal is specified. A configuration that enables the communication system shown in FIG. 1, 6, or 7 to detect a fault and specify a fault location will be described.

Figure 13:
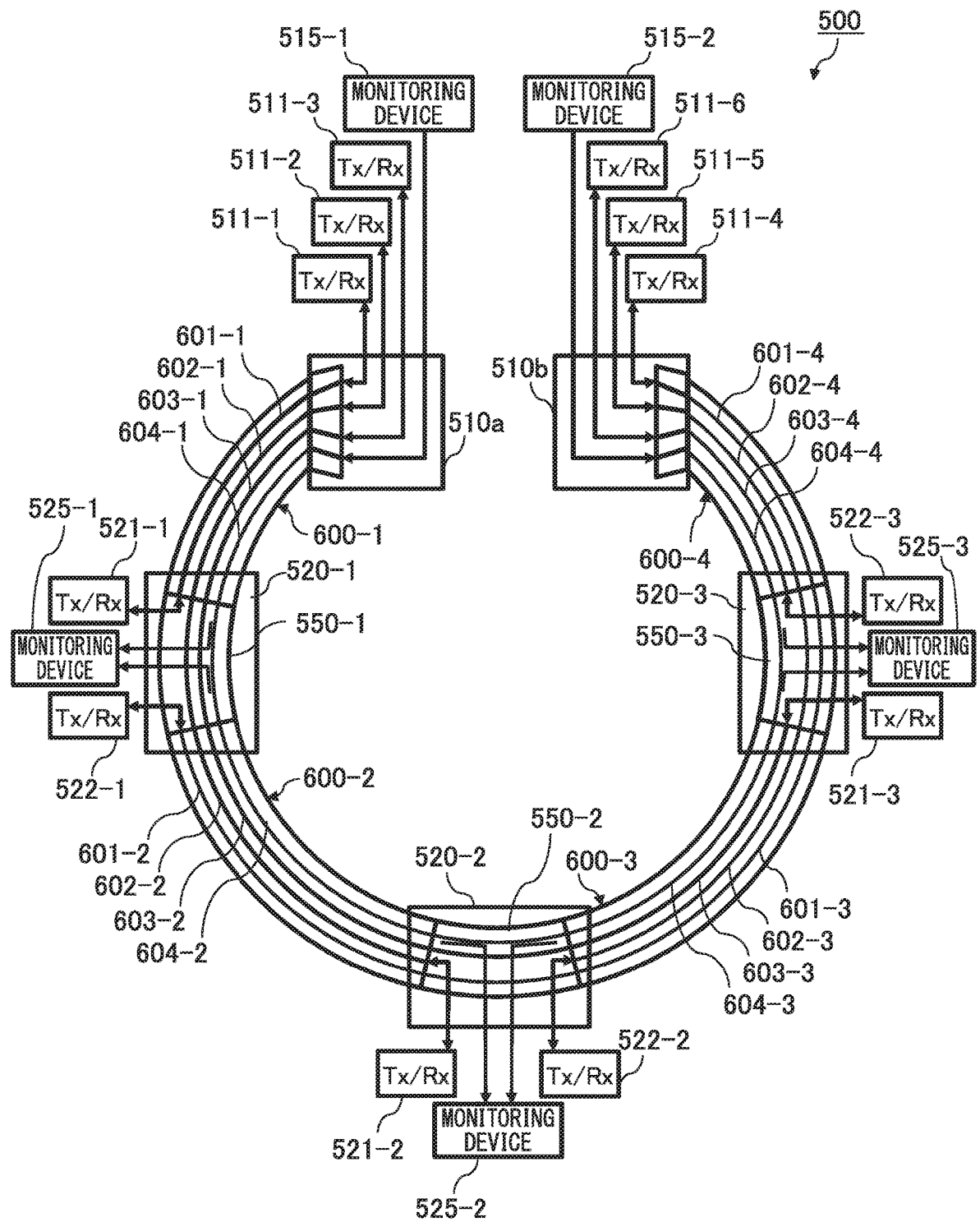
FIG. 13 is a diagram showing a configuration example of a communication system according to a first embodiment.

FIG. 13 is a diagram showing a configuration example of a communication system 500 according to the first embodiment. The communication system 500 includes transceiving nodes 510a and 510b and n Add/Drop nodes 520. FIG. 13 shows a configuration example of the communication system 500 when n=3. The communication system 500 has a physical topology of a dual-system two-way ring configuration. The nodes are connected together by MCFs 600-1 to 600-4. The connection between nodes is the same as the connection between nodes in the communication system 100A shown in FIG. 6. Each of the MCFs 600 of the communication system 500 includes four cores 601 to 604.

Each node of the communication system 500 includes a transceiving device (Tx/Rx) that performs communication between nodes and a monitoring device. The monitoring device operates as a fault detection unit and detects whether a fault has occurred in the MCF 600 configured to connect together nodes. Transceiving devices 511-1 to 511-3 and a monitoring device 515-1 are provided in the transceiving node 510a. Transceiving devices 521-1 and 522-1 and a monitoring device 525-1 are provided in the Add/Drop node 520-1. Transceiving devices 521-2 and 522-2 and a monitoring device 525-2 are provided in the Add/Drop node 520-2. Transceiving devices 521-3 and 522-3 and a monitoring device 525-3 are provided in the Add/Drop node 520-3. Transceiving devices 511-4 to 511-6 and a monitoring device 515-2 are provided in the transceiving node 510b.

In the transceiving node 510a, the transceiving devices 511-1 to 511-3 generate optical signals including information addressed to the Add/Drop nodes 520-1 to 520-3, respectively. Three optical signals generated by the transceiving devices 511-1 to 511-3 are input to the cores 601-1 to 603-1 of the MCF 600-1, respectively. Moreover, the transceiving devices 511-1 to 511-3 receive optical signals from the Add/Drop nodes 520-1 to 520-3 via the cores 601-1 to 603-1 of the MCF 600-1, respectively.

The monitoring device 515-1 operates as a first detection signal output unit and generates a fault detection optical signal in the MCF 600. The fault detection optical signal generated by the monitoring device 515-1 is input to the core 604-1 of the MCF 600-1. Moreover, the monitoring device 515-1 receives a fault detection optical signal from the core 604-1 of the MCF 600-1. The monitoring device 515-1 operates as a fault detection unit and determines whether a fault has occurred in the MCF 600 on the basis of the received fault detection optical signal.

In the transceiving node 510b, each of the transceiving devices 511-4 to 511-6 generate optical signals including information addressed to the Add/Drop nodes 520-1 to 520-3. Three optical signals generated by the transceiving devices 511-4 to 511-6 are input to the cores 601-4 to 603-4 of the MCF 600-4, respectively. Moreover, the transceiving devices 511-4 to 511-6 receive optical signals from the Add/Drop nodes 520-1 to 520-3 via the cores 601-4 to 603-4 of the MCF 600-4, respectively.

The monitoring device 515-2 operates as a second detection signal output unit and generates a fault detection optical signal in the MCF 600. The fault detection optical signal generated by the monitoring device 515-2 is input to the core 604-4 of the MCF 600-4. Moreover, the monitoring device 515-2 receives a fault detection optical signal from the core 604-4 of the MCF 600-4. The monitoring device 515-2 operates as a fault detection unit and determines whether a fault has occurred in the MCF 600 on the basis of the received fault detection optical signal.

The fault detection optical signal generated by the monitoring device 515-1 and the fault detection optical signal generated by the monitoring device 515-2 may be optical signals of different wavelengths so that the signals are easily distinguished in the respective Add/Drop nodes 520. Moreover, the fault detection optical signal generated by the monitoring device 515-1 and the fault detection optical signal generated by the monitoring device 515-2 are existing fault detection optical signals in respective nodes and are stored in respective monitoring devices.

In the transceiving node 510a, a fan-in device or a fan-out device is used for inputting an optical signal to the MCF 600-1 and acquiring an optical signal from the MCF 600-1. Similarly to the transceiving node 510a, in the transceiving node 510b, a fan-in device or a fan-out device is used for inputting an optical signal to the MCF 600-4 and acquiring an optical signal from the MCF 600-4.

A connector 550 is provided in each Add/Drop node 520. The connector 550-$i$ of the Add/Drop node 520-$i$ ($i$=1, 2, 3) is connected to the MCF 600-$i$ and the MCF 600-($i$+1). The connector 550-$i$ extracts an optical signal including information addressed to the subject node among the optical signals input to the MCFs 600 in the transceiving nodes 510a and 510b from the core of the MCF 600-$i$ and the core of the MCF 600-($i$+1). The connector 550-$i$ inputs an optical signal including the information addressed to the transceiving nodes 510a and 510b to the core of the MCF 600-$i$ and the core of the MCF 600-($i$+1).

In the Add/Drop node 520-1, the connector 550-$i$ extracts an optical signal addressed to the subject node from the core 601-1 of the MCF 600-1. The connector 550-1 outputs the extracted optical signal to the transceiving device 521-1. Moreover, the connector 550-1 inputs an optical signal generated by the transceiving device 521-1 to the core 601-1 of the MCF 600-1. The optical signal generated by the transceiving device 521-1 is an optical signal including the information that is transmitted from the subject node to the transceiving node 510a.

The connector 550-1 extracts an optical signal addressed to the subject node from the core 601-2 of the MCF 600-2. The connector 550-1 outputs the extracted optical signal to the transceiving device 522-1. The connector 550-1 inputs the optical signal generated by the transceiving device 522-1 to the core 601-2 of the MCF 600-2. The optical signal generated by the transceiving device 522-1 is an optical signal including the information that is transmitted from the subject node to the transceiving node 510b. The connector 550-1 connects the cores 602-1 and 603-1 of the MCF 600-1 and the cores 602-2 and 603-2 of the MCF 600-2. The connector 550-1 relays an optical signal between the MCF 600-1 and the MCF 600-2.

The connector 550-1 distributes the optical signal of the core 604-1 of the MCF 600-1 into two optical signals. The connector 550-1 outputs one of the two optical signals to the monitoring device 525-1 and adds the other optical signal to the core 604-2 of the MCF 600-2. The monitoring device 525-1 determines whether the transceiving node 510a has received the fault detection optical signal transmitted from the monitoring device 515-1. When the fault detection optical signal transmitted from the monitoring device 515-1 is received, the monitoring device 525-1 determines whether a fault has not occurred in the MCF 600-1. On the other hand, when the fault detection optical signal transmitted from the monitoring device 515-1 is not received, the monitoring device 525-1 determines that a fault has occurred in the MCF 600-1. When it is not possible to receive the fault detection optical signal for a predetermined period, it may be determined that the signal cannot be received.

The connector 550-1 distributes the optical signal of the core 604-2 of the MCF 600-2 into two optical signals. The connector 550-1 outputs one of the two optical signals to the monitoring device 525-1 and adds the other optical signal to the core 604-1 of the MCF 600-1. The monitoring device 525-1 determines whether the transceiving node 510b has received the fault detection optical signal transmitted from the monitoring device 515-2. When the fault detection optical signal transmitted from the monitoring device 515-2 is received, the monitoring device 525-1 determines whether a fault has not occurred in the MCFs 600-2 to 600-4. On the other hand, when the fault detection optical signal transmitted from the monitoring device 515-2 is not received, the monitoring device 525-1 determines that a fault has occurred in one of the MCFs 600-2 to 600-4.

In the Add/Drop node 520-2, the connector 550-2 extracts an optical signal addressed to the subject node from each of the core 602-2 of the MCF 600-2 and the core 602-3 of the MCF 600-3. The connector 550-2 outputs the optical signal extracted from the core 602-2 to the transceiving device 521-2 and outputs the optical signal extracted from the core 602-3 to the transceiving device 522-2. Moreover, the connector 550-2 inputs the optical signal generated by the transceiving device 521-2 to the core 602-2 of the MCF 600-2 and inputs the optical signal generated by the transceiving device 522-2 to the core 602-3 of the MCF 600-3. The optical signal generated by the transceiving device 521-2 is an optical signal including information that is transmitted from the subject node to the transceiving node 510a. The optical signal generated by the transceiving device 522-2 is an optical signal including information that is transmitted from the subject node to the transceiving node 510b. Moreover, the connector 550-2 connects together the cores 601-2 and 603-2 of the MCF 600-2 and the cores 601-3 and 603-3 of the MCF 600-3. The connector 550-2 relays an optical signal between the MCF 600-2 and the MCF 600-3.

The connector 550-2 distributes the optical signal of the core 604-2 of the MCF 600-2 into two optical signals. The connector 550-2 outputs one of the two distributed optical signals to the monitoring device 525-2 and adds the other optical signal to the core 604-3 of the MCF 600-3. The monitoring device 525-2 determines whether the transceiving node 510a has received the fault detection optical signal transmitted from the monitoring device 515-1. When the fault detection optical signal transmitted from the monitoring device 515-1 is received, the monitoring device 525-2 determines whether a fault has not occurred in the MCFs 600-1 and 600-2. On the other hand, when the fault detection optical signal transmitted from the monitoring device 515-1 is not received, the monitoring device 525-2 determines that a fault has occurred in the MCF 600-1 or 600-2.

The connector 550-2 distributes the optical signal of the core 604-3 of the MCF 600-3 into two optical signals. The connector 550-2 outputs one of the two optical signals to the monitoring device 525-2 and adds the other optical signal to the core 604-2 of the MCF 600-2. The monitoring device 525-2 determines whether the transceiving node 510b has received the fault detection optical signal transmitted from the monitoring device 515-2. When the fault detection optical signal transmitted from the monitoring device 515-2 is received, the monitoring device 525-2 determines whether a fault has not occurred in the MCFs 600-3 to 600-4. On the other hand, when the fault detection optical signal transmitted from the monitoring device 515-2 is not received, the monitoring device 525-2 determines that a fault has occurred in the MCF 600-3 or 600-4.

In the Add/Drop node 520-3, the connector 550-3 extracts an optical signal addressed to the subject node from each of the core 603-3 of the MCF 600-3 and the core 603-4 of the MCF 600-4. The connector 550-3 outputs the optical signal extracted from the core 603-3 to the transceiving device 521-3 and outputs the optical signal extracted from the core 603-4 to the transceiving device 522-3. Moreover, the connector 550-2 inputs the optical signal generated by the transceiving device 521-3 to the core 603-3 of the MCF 600-3 and inputs the optical signal generated by the transceiving device 522-3 to the core 603-4 of the MCF 600-4. The optical signal generated by the transceiving device 521-3 is an optical signal including information that is transmitted from the subject node to the transceiving node 510a. The optical signal generated by the transceiving device 522-3 is an optical signal including information that is transmitted from the subject node to the transceiving node 510b. Moreover, the connector 550-3 connects together the cores 601-3 and 602-3 of the MCF 600-3 and the cores 601-4 and 602-4 of the MCF 600-4. The connector 550-3 relays an optical signal between the MCF 600-3 and the MCF 600-4.

The connector 550-3 distributes the optical signal of the core 604-3 of the MCF 600-3 into two optical signals. The connector 550-3 outputs one of the two optical signals to the monitoring device 525-3 and adds the other optical signal to the core 604-4 of the MCF 600-4. The monitoring device 525-3 determines whether the transceiving node 510a has received the fault detection optical signal transmitted from the monitoring device 515-1. When the fault detection optical signal transmitted from the monitoring device 515-1 is received, the monitoring device 525-3 determines whether a fault has not occurred in the MCFs 600-1 to 600-3. On the other hand, when the fault detection optical signal transmitted from the monitoring device 515-1 is not received, the monitoring device 525-3 determines that a fault has occurred in one of the MCFs 600-1 to 600-3.

The connector 550-3 distributes the optical signal of the core 604-4 of the MCF 600-4 into two optical signals. The connector 550-5 outputs one of the two optical signals to the monitoring device 525-3 and adds the other optical signal to the core 604-3 of the MCF 600-3. The monitoring device 525-3 determines whether the transceiving node 510b has received the fault detection optical signal transmitted from the monitoring device 515-2. When the fault detection optical signal transmitted from the monitoring device 515-2 is received, the monitoring device 525-3 determines whether a fault has not occurred in the MCF 600-4. On the other hand, when the fault detection optical signal transmitted from the monitoring device 515-2 is not received, the monitoring device 525-3 determines that a fault has occurred in the MCF 600-4.

In the communication system 500 of the present embodiment, the fault detection optical signal is transmitted through the core 604 among the cores 601 to 604 provided in the MCFs 600-1 to 600-4. The fault detection optical signal is transmitted in both directions of a transmission direction from the transceiving node 510a to the transceiving node 510b and a transmission direction from the transceiving node 510b to the transceiving node 510a. In the respective Add/Drop nodes 120-1 to 120-3, each of the monitoring devices 525-1 to 525-3 detects a fault in the MCFs 600-1 to 600-4 on the basis of an optical signal transmitted in the core 604.

FIG. 14 is a diagram showing an example of a table used when specifying a fault location in the first embodiment. Each row of the table shown in FIG. 14 indicates the Add/Drop node 520 that detects a fault when a fault occurs in each of the MCFs 600-1 to 600-4. "X" indicates that a fault has been detected, and "0" indicates that a fault has not been detected. In this way, since the fault detection optical signal is transmitted in two directions along the two transmission paths in the communication system 500 that uses the MCF 600, it is possible to detect a fault and specify a section between nodes which a fault has occurred. The fault location may be specified using a detection result of a fault in the Add/Drop node 520 and the detection result of a fault in the transceiving nodes 510a and 510b.

The process of specifying a fault location using the table shown in FIG. 14 may be performed by the monitoring devices 515-1 and 515-2 provided in the transceiving nodes 510a and 510b or a higher-layer fault location specifying device that is not shown. Moreover, in the present embodiment, although one monitoring device 525 provided in the Add/Drop node 520 receives two fault detection optical signals of which the transmission directions are different, a monitoring device may be provided for respective fault detection optical signals.

In the communication system of the present embodiment, a configuration in which the monitoring devices 515-1 and 515-2 of the transceiving nodes 510a and 510b serving as the starting and ending nodes output the fault detection optical signal has been described. However, any one of the monitoring devices may operate as a fault detection unit that is configured to output a fault detection optical signal, and the other monitoring device may operate as a fault location specifying unit that specifies a fault location in a communication path.

Second Embodiment

In a communication system of a second embodiment, similarly to the communication system 500 of the first embodiment, a fault detection optical signal is transmitted by a specific core among a plurality of cores of an MCF, an optical signal of the core is acquired in each node, and the presence of a fault is determined. Furthermore, in a communication system of the present embodiment, when a fault is detected, a fault location based on an acquisition state of the fault detection optical signal is specified. A configuration that enables the communication system shown in FIG. 1, 6, or 7 to detect a fault and specify a fault location will be described.

Figure 15:
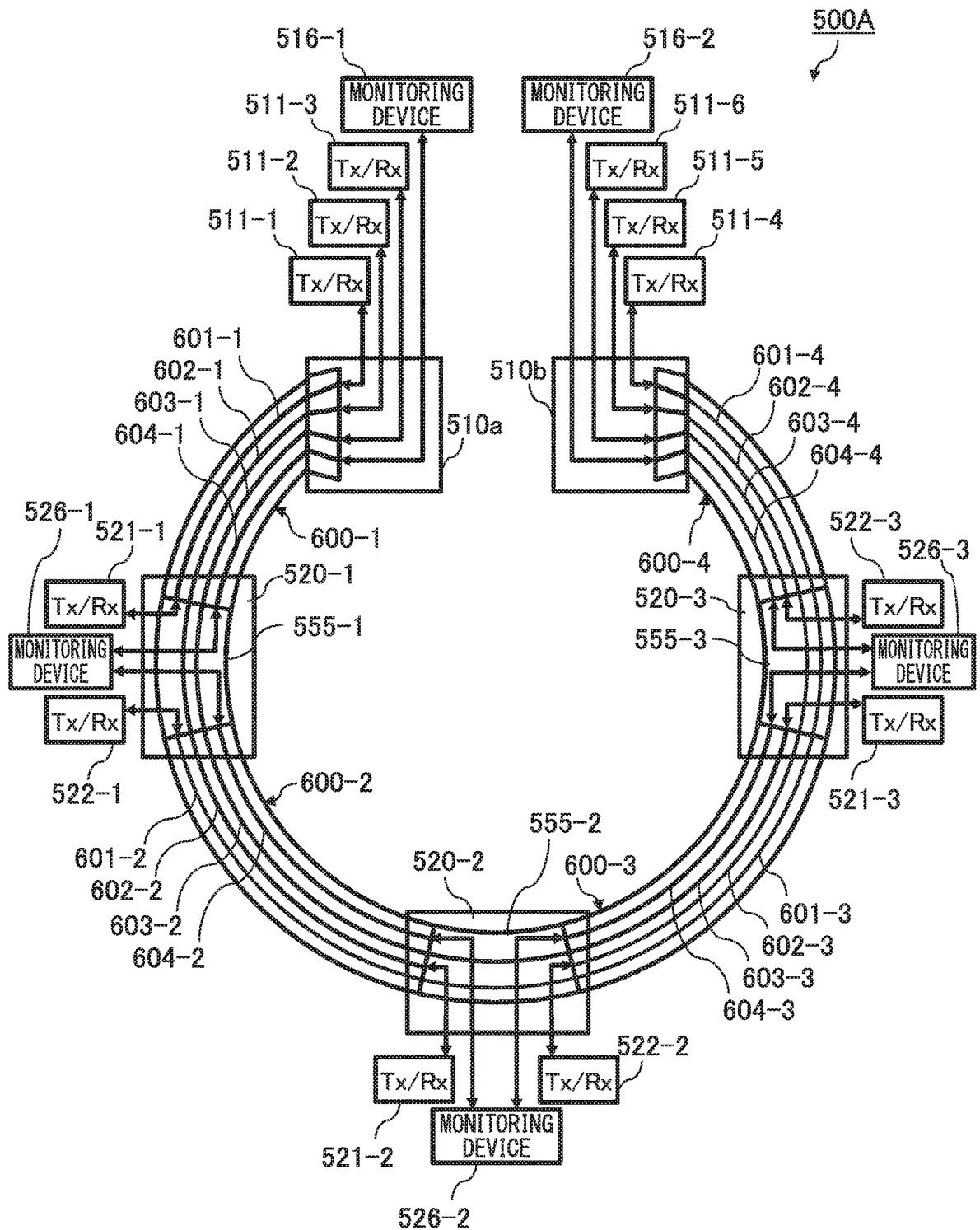
FIG. 15 is a diagram showing a configuration example of a communication system according to a second embodiment.

FIG. 15 is a diagram showing a configuration example of a communication system 500A according to the second embodiment. The communication system 500A includes transceiving nodes 510a and 510b and n Add/Drop nodes 520. FIG. 15 shows a configuration example of the communication system 500A when n=3. The communication system 500A has a physical topology of a dual-system two-way ring configuration. The nodes are connected together by MCFs 600-1 to 600-4. The connection between nodes is the same as the connection between nodes in the communication system 100A shown in FIG. 6. Each of the MCFs 600 of the communication system 500A includes four cores 601 to 604. In the present embodiment, the same constituent elements as those of the communication system 500 of the first embodiment will be denoted by the same reference numerals and redundant description thereof will be omitted.

Each node of the communication system 500A includes a transceiving device (Tx/Rx) that performs communication between nodes and a monitoring device. The monitoring device operates as a fault detection unit and specifies the location where a fault occurs as well as detecting whether a fault has occurred in the MCF 600 that is configured to connect together nodes. The transceiving nodes 510a and 510b include monitoring devices 516-1 and 516-2 instead of the monitoring devices 515-1 and 515-2. The Add/Drop nodes 520-1 to 520-3 include monitoring devices 526-1 to 526-3 instead of the monitoring devices 525-1 to 525-3.

A connector 555 is provided in the respective Add/Drop nodes 520. The connector 555-i of the Add/Drop node 520-i (i=1, 2, 3) is connected to the MCF 600-i and the MCF 600-(i+1). The connector 555-i extracts an optical signal including information addressed to the subject node among the optical signals input to the MCFs 600 in the transceiving nodes 510a and 510b from the core of the MCF 600-i and the core of the MCF 600-(i+1).

In each Add/Drop node 520, input and output of an optical signal between the connector 555-i and the transceiving devices 521-i and 522-i is similar to that of the first embodiment. Moreover, the operation of the transceiving devices 511-1 to 511-6 of the transceiving node 510 is similar to that of the first embodiment. Hereinafter, input and output of an optical signal between the monitoring device 526-i and the connector 555-i and the operation of the monitoring devices 516-1, 516-2, and 526-i, which are different from those of the first embodiment, will be described.

In the transceiving node 510a, the monitoring device 516-1 generates a fault detection optical signal in the MCF 600-1. The fault detection optical signal generated by the monitoring device 516-1 is added to the core 604-1 of the MCF 600-1 by a fan-in device or a fan-out device.

In the Add/Drop node 520-1, the connector 555-1 drops a fault detection optical signal from the core 604-1 of the MCF600-1. The connector 555-1 connects the dropped fault detection optical signal to the monitoring device 526-1. The monitoring device 526-1 determines whether the fault detection optical signal transmitted from the monitoring device 516-1 has been received. When the fault detection optical signal transmitted from the monitoring device 516-1 is received, the monitoring device 526-1 determines that a fault has not occurred in the MCF 600-1. On the other hand, when the fault detection optical signal transmitted from the monitoring device 516-1 is not received, the monitoring device 526-1 determines that a fault has occurred in the MCF 600-1. Moreover, the monitoring device 526-1 generates a fault detection optical signal in the MCF 600-2, similarly to the monitoring device 516-1. The fault detection optical signal generated by the monitoring device 526-1 is added to the core 604-2 of the MCF 600-2 by the connector 555-1.

In the Add/Drop node 520-2, the connector 555-2 drops the fault detection optical signal from the core 604-2 of the MCF 600-2. The connector 555-2 connects the dropped fault detection optical signal to the monitoring device 526-2. The monitoring device 526-2 determines whether the fault detection optical signal transmitted from the monitoring device 526-1 has been received. When the fault detection optical signal transmitted from the monitoring device 526-1 is received, the monitoring device 526-2 determines that a fault has not occurred in the MCF 600-2. On the other hand, when the fault detection optical signal transmitted from the monitoring device 526-1 is not received, the monitoring device 526-2 determines that a fault has occurred in the MCF 600-2. Moreover, the monitoring device 526-2 generates a fault detection optical signal in the MCF 600-3 similarly to the monitoring devices 516-1 and 526-1. The fault detection optical signal generated by the monitoring device 526-2 is added to the core 604-3 of the MCF 600-3 by the connector 555-2.

In the Add/Drop node 520-3, the connector 555-3 drops the fault detection optical signal from the core 604-3 of the MCF 600-3. The connector 555-3 connects the dropped fault detection optical signal to the monitoring device 526-3. The monitoring device 526-3 determines whether the fault detection optical signal transmitted from the monitoring device 526-2 has been received. When the fault detection optical signal transmitted from the monitoring device 526-2 is received, the monitoring device 526-3 determines that a fault has not occurred in the MCF 600-3. On the other hand, when the fault detection optical signal transmitted from the monitoring device 526-2 is not received, the monitoring device 526-3 determines that a fault has occurred in the MCF 600-3. Moreover, the monitoring device 526-3 generates a fault detection optical signal in the MCF 600-4 similarly to the monitoring device 516-1 and the like. The fault detection optical signal generated by the monitoring device 526-3 is added to the core 604-4 of the MCF 600-4 by the connector 555-2.

In the transceiving node 510b, the monitoring device 516-2 receives a fault detection optical signal from the core 604-4 of the MCF 600-4. The monitoring device 516-2 determines whether the fault detection optical signal transmitted from the monitoring device 526-3 has been received. When the fault detection optical signal transmitted from the monitoring device 526-3 is received, the monitoring device 516-2 determines that a fault has not occurred in the MCF 600-4. On the other hand, when the fault detection optical signal transmitted from the monitoring device 526-3 is not received, the monitoring device 516-2 determines that a fault has occurred in the MCF 600-4. Moreover, the monitoring device 516-2 generates a fault detection optical signal in the MCF 600-4 similarly to the monitoring device 516-1 and the like. The fault detection optical signal generated by the monitoring device 516-2 is added to the core 604-4 of the MCF 600-4 by a fan-in device or a fan-out device.

In the Add/Drop node 520-3, the connector 555-3 drops the fault detection optical signal from the core 604-4 of the MCF 600-4. The connector 555-3 connects the dropped fault detection optical signal to the monitoring device 526-3. The monitoring device 526-3 determines whether the fault detection optical signal transmitted from the monitoring device 516-2 has been received. When the fault detection optical signal transmitted from the monitoring device 516-2 is received, the monitoring device 526-3 determines that a fault has not occurred in the MCF 600-4. On the other hand, when the fault detection optical signal transmitted from the monitoring device 516-2 is not received, the monitoring device 526-3 determines that a fault has occurred in the MCF 600-4. Moreover, the monitoring device 526-3 generates a fault detection optical signal in the MCF 600-3. The fault detection optical signal generated by the monitoring device 526-3 is added to the core 604-3 of the MCF 600-3 by the connector 555-3.

In the Add/Drop node 520-2, the connector 555-2 drops the fault detection optical signal from the core 604-3 of the MCF 600-3. The connector 555-2 connects the dropped fault detection optical signal to the monitoring device 526-2. The monitoring device 526-2 determines whether the fault detection optical signal transmitted from the monitoring device 526-3 has been received. When the fault detection optical signal transmitted from the monitoring device 526-3 is received, the monitoring device 526-2 determines that a fault has not occurred in the MCF 600-3. On the other hand, when the fault detection optical signal transmitted from the monitoring device 526-3 is not received, the monitoring device 526-2 determines that a fault has occurred in the MCF 600-3. Moreover, the monitoring device 526-2 generates a fault detection optical signal in the MCF 600-2. The fault detection optical signal generated by the monitoring device 526-2 is added to the core 604-2 of the MCF 600-2 by the connector 555-2.

In the Add/Drop node 520-1, the connector 555-1 drops the fault detection optical signal from the core 604-2 of the MCF 600-2. The connector 555-1 connects the dropped fault detection optical signal to the monitoring device 526-1. The monitoring device 526-1 determines whether the fault detection optical signal transmitted from the monitoring device 526-2 has been received. When the fault detection optical signal transmitted from the monitoring device 526-2 is received, the monitoring device 526-1 determines that a fault has not occurred in the MCF 600-2. On the other hand, when the fault detection optical signal transmitted from the monitoring device 526-2 is not received, the monitoring device 526-1 determines that a fault has occurred in the MCF 600-2. Moreover, the monitoring device 526-1 generates a fault detection optical signal in the MCF 600-1. The fault detection optical signal generated by the monitoring device 526-1 is added to the core 604-1 of the MCF 600-1 by the connector 555-1.

In the transceiving node 510a, the monitoring device 516-1 determines whether a fault detection optical signal is received from the core 604-1 of the MCF 600-1. When the fault detection optical signal transmitted from the monitoring device 526-1 is received, the monitoring device 516-1 determines that a fault has not occurred in the MCF 600-1. On the other hand, when the fault detection optical signal transmitted from the monitoring device 526-1 is not received, the monitoring device 516-1 determines that a fault has occurred in the MCF 600-1.

In the communication system 500A of the present embodiment, the fault detection optical signal is transmitted in the core 604 of the cores 601 to 604 of the MCFs 600-1 to 600-4. In the transceiving nodes 510a and 510b and the Add/Drop nodes 520-1 to 520-3, each of the monitoring devices 516-1, 516-2, 526-1, 526-2, and 526-3 detects a fault in the MCF 600 between adjacent nodes on the basis of whether the fault detection optical signal transmitted by the core 604 is received. Each monitoring device operates as a fault detection unit that detects a fault on the basis of the fault detection optical signal transmitted by the core 604. Moreover, each monitoring device operates a detection signal output unit that generates and outputs the fault detection optical signal transmitted by the core 604.

In the communication system 500A of the present embodiment, the fault detection optical signal is transmitted in the core 604 of the cores 601 to 604 provided in the MCFs 600-1 to 600-4. The fault detection optical signal is transmitted in two directions of a transmission direction from the transceiving node 510a to the transceiving node 510b and a transmission direction from the transceiving node 510b to the transceiving node 510a.

According to the communication system 500A of the present embodiment, it is possible to detect a fault in the MCF 600 connected to each node on the basis of whether the fault detection optical signal transmitted by the core 604 is received. Moreover, it is possible to specify a fault location on the basis of a detection result of a fault in each node.

When the occurrence of a fault is detected, the monitoring device provided in each node may transmit fault information for notifying of fault detection and a fault location to another adjacent node via the MCF 600 in which a fault has not occurred among the MCFs 600 connected to the subject node. Moreover, the node having received the fault information may transmit the fault information to another adjacent node via the MCF 600. In this way, the nodes of the communication system 500A can share information on the occurrence of a fault and the location where a fault has occurred within an allowable range.

Moreover, upon detecting the occurrence of a fault, the monitoring device provided in each node may transmit the fault information for notifying of fault detection and a fault location to a higher-layer device via another network (for example, DCN: data communication network) used for communication control. In this case, the higher-layer controller may control communication in respective nodes on the basis of the fault information. Examples of the communication control include selecting a transmission path that avoids a fault location and suppressing communication in a node adjacent to the fault location.

According to the communication systems of the respective embodiments, it is possible to detect the occurrence of a fault in a communication path formed by a MCF that is configured to connect together nodes and specify a fault location when a fault has occurred.

In the communication systems of the respective embodiments, the fault detection optical signals of which the transmission directions are different may be transmitted using two cores in the MCF without transmitting the same using one core. Moreover, in the communication systems of the respective embodiments, although the transceiving nodes 510a and 510b are described in a distinguished manner, the transceiving nodes 510a and 510b may be provided physically at the same position.

In the respective embodiments, although a communication system having a ring-type physical topology has been shown and described, the communication system may have another physical topology such as a linear physical topology. Moreover, rather than transmitting the fault detection optical signal in both directions, the fault detection optical signal may be transmitted in one direction only. For example, the fault detection optical signal may be transmitted in the direction from the transceiving node 510a to the transceiving node 510b only. In this case, although there is a problem that it is not possible to distinguish a fault occurring state of the MCF 600-4 from a normal state, an optical signal extraction unit for detecting faults in the connector 550 may detect an optical signal in one direction only. In this way, it is possible to simplify the internal configuration.

The fault detection optical signal may be an optical signal including fault detection information and information on monitoring and operation of a transmission path in a communication system. For example, in a communication system that performs WDM transmission using a single-core fiber, information on monitoring and operation of the same core is transmitted in a wavelength different from a signal wavelength range. When the conventional WDM transmission is performed in a communication system which uses a multi-core fiber, although information on monitoring and operation is transmitted for each of cores, these pieces of information on monitoring and operation may be collectively transmitted in a superimposed manner in another fault detection core independent from a core used for communication as a fault detection optical signal. In this case, the pieces of information on monitoring and operation for respective cores may be represented as one piece of information on monitoring and operation using a certain core of the multi-core fiber as a representative core of the multi-core fiber.

In the communication systems of the respective embodiments, a configuration in which the monitoring device is provided in all Add/Drop nodes to specify a multi-core fiber in which a fault has occurred has been described. However, when the occurrence of a fault is detected and a fault segment is specified in respective segments between arbitrary Add/Drop nodes formed by a plurality of multi-core fibers, a monitoring device may be provided in Add/Drop nodes positioned at both ends of each segment without providing the monitoring device in all Add/Drop nodes.

In the communication systems of the respective embodiments, a non-modulated optical signal having a certain light intensity may be used as the fault detection optical signal. In this case, no information is assigned to the fault detection optical signal, and when missing of an optical signal is detected by a monitoring device provided in each node, it is determined that a fault has occurred in the MCF.

The monitoring device provided in each of the Add/Drop nodes 520 may be included in a transceiving device provided in the Add/Drop node 520. In this case, the fault information may be transmitted with an optical signal as information addressed to the transceiving nodes 510a and 510b without using the core 604 that transmits the fault detection optical signal.

As shown in FIGS. 11 and 12, when a SCF is used for connection between nodes, the SCF that transmits the fault detection optical signal is a fault detection target. In this case, a SCF that does not transmit the fault detection optical signal is not a fault detection target. That is, a fault of the MCF is detected in a segment in which the MCF is used, and a fault of the SCF that transmits the fault detection optical signal is detected in a segment in which a plurality of SCFs is used. However, since the plurality of SCFs used for connection between nodes are bound together, there is a high possibility that, when a fault occurs in a SCF that transmits the fault detection optical signal, a fault may also have occurred in another SCF. Therefore, the fault detection method in the communication systems of the first and second embodiments is useful in a communication system in which nodes or some of nodes are connected together by a SCF.

While embodiments of the present invention have been described with reference to the drawings, a specific structure is not limited to the embodiments but the present invention embraces design modifications made without departing from the spirit of the present invention.

INDUSTRIAL APPLICABILITY

The present invention is applicable to a use in which it is indispensable to detect a fault and specify a fault location in a network configured using a multi-core fiber.

REFERENCE SIGNS LIST 500, 500A Communication system
510a, 510b Transceiving node
511 Transceiving device
515, 516 Monitoring device
520 Add/Drop node
521, 522 Transceiving device
525 Monitoring device
550, 555 Connector
600 MCF
601, 602, 603, 604 Core

The invention claimed is:

1. A communication system comprising:
three or more nodes;
a plurality of multi-core fibers, each of the plurality of multi-core fibers having a plurality of cores, each of the plurality of multi-core fibers being used in at least a partial segment of a connection between the nodes; and
a fault location specifying monitoring device comprising a transceiver and configured to specify a multi-core fiber in which a fault has occurred among the plurality of multi-core fibers;
wherein a starting node serving as starting point and an ending node serving as ending point in a network including the three or more nodes, include, respectively, a first detection signal output monitoring device comprising a first transmitter and configured to output a first fault detection signal to be transmitted to the ending node by at least one of the plurality of cores provided in each of the plurality of multi-core fibers configured to connect together the nodes and a second detection signal output monitoring device comprising a second transmitter and configured to output a second fault detection signal to be transmitted to the starting node by at least one of the plurality of cores provided in each of the plurality of multi-core fibers, and
wherein a node other than the starting node and the ending node among the three or more nodes, includes,
a connector configured to divide an optical signal of the at least one of the plurality of cores that transmits the first fault detection signal and the second fault detection signal that are output from the starting node or the ending node respectively, output a part of the optical signal and relay the other part of the optical signal to a next node, and
a first fault detection monitoring device comprising a first receiver and configured to determine whether the fault has occurred in a segment between the starting node and own node and a segment between the ending node and own node on the basis of a detection result of the first fault detection signal and the second fault detection signal in the part of the optical signal output from the connector,
wherein the fault location specifying monitoring device is configured to specify the multi-core fiber in which the fault has occurred among the plurality of multi-core fibers on the basis of a determination result at each node for the first fault detection signal and the second fault detection signal that are transmitted in both directions between the starting node and the ending node.

2. The communication system according to claim 1, wherein
the first detection signal output monitoring device and the second detection signal output monitoring device are configured to output the first fault detection signal and the second fault detection signal to the at least one of the plurality of cores which is not used for communication between the nodes, respectively.

3. The communication system according to claim 2, wherein
the first detection signal output monitoring device and the second detection signal output monitoring device are configured to output the first fault detection signal and the second fault detection signal including information on monitoring or operation in the communication system, respectively.

4. The communication system according to claim 1, wherein
the first detection signal output monitoring device and the second detection signal output monitoring device are configured to output the first fault detection signal and the second fault detection signal to the at least one of the plurality of cores which is used for communication between the nodes, respectively.

5. The communication system according to claim 4, wherein the first detection signal output monitoring device and the second detection signal output monitoring device are configured to output the first fault detection signal and the second fault detection signal including information on monitoring or operation in the communication system, respectively.

6. The communication system according to claim 1, wherein the one of the starting node and the ending node further includes,
a second fault detection monitoring device comprising a second receiver and configured to determine whether the fault has occurred in a segment between own node and the other one of the starting node and the ending node, on the basis of a detection result of each of the first fault detection signal and the second fault detection signal that is transmitted via the node other than the starting node and the ending node among the three or more nodes.

7. The communication system according to claim 1, wherein
the first fault detection monitoring device is configured to determine that the fault has occurred when reception light including the first fault detection signal or the second fault detection signal is not detected.

8. The communication system according to claim 1, wherein when it is determined that the fault has occurred between the nodes, the first fault detection monitoring device is configured to notify a higher-layer controller of fault information indicating the occurrence of the fault and the segment in which the fault is detected.

9. A fault detection method in a communication system comprising three or more nodes, and a plurality of multi-core fibers, each of the plurality of multi-core fibers having a plurality of cores, each of the plurality of multi-core fibers being used in at least a partial segment of a connection between the nodes, the fault detection method comprising:
- a first detection signal output step of outputting, by a starting node serving as starting point in a network including the three or more nodes, a first fault detection signal to be transmitted to an ending node serving as ending point by at least one of the plurality of cores provided in each of the plurality of multi-core fibers configured to connect together the nodes;
- a second detection signal output step of outputting, by the ending node in the network, a second fault detection signal to be transmitted to the starting node by at least one of the plurality of cores provided in each of the plurality of multi-core fibers; and
- a fault detection step of determining, by a node other than the starting node and the ending node among the three or more nodes, whether a fault has occurred in a segment between the starting node and own node and a segment between the ending node and own node on the basis of a detection result of the first fault detection signal and the second fault detection signal in a part of an optical signal output from a connector, the connector being configured to divide an optical signal of the at least one of the plurality of cores that transmits the first fault detection signal and the second fault detection signal that are output from the starting node or the ending node respectively, output the part of the optical signal and relay the other part of the optical signal to a next node,
- a fault location specifying step of specify a multi-core fiber in which the fault has occurred among the plurality of multi-core fibers on the basis of a determination result at each node for the first fault detection signal and the second fault detection signal that are transmitted in both directions between the starting node and the ending node.

* * * * *